US011993823B2

(12) United States Patent
Hoydick et al.

(10) Patent No.: US 11,993,823 B2
(45) Date of Patent: *May 28, 2024

(54) HIGH STRENGTH ANNEALED STEEL PRODUCTS AND ANNEALING PROCESSES FOR MAKING THE SAME

(71) Applicant: UNITED STATES STEEL CORPORATION, Pittsburgh, PA (US)

(72) Inventors: David Paul Hoydick, Pittsburgh, PA (US); Eduardo Augusto Silva, Murrysville, PA (US); Matthew Michael McCosby, New Castle, PA (US)

(73) Assignee: United States Steel Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,127

(22) Filed: Aug. 19, 2019

(65) Prior Publication Data

US 2020/0040422 A1 Feb. 6, 2020

Related U.S. Application Data

(63) Continuation-in-part of application No. 15/591,344, filed on May 10, 2017, now Pat. No. 10,385,419, and
(Continued)

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/013* (2013.01); *B32B 15/043* (2013.01); *B32B 15/18* (2013.01);
(Continued)

(58) Field of Classification Search
CPC ..... B32B 15/013; B32B 15/043; B32B 15/18; C21D 2211/001; C21D 2211/005;
(Continued)

(56) References Cited

U.S. PATENT DOCUMENTS 669,925 A 3/1901 Hibbard
4,165,964 A 8/1979 Yonezawa et al.
(Continued)

FOREIGN PATENT DOCUMENTS

EP 0320003 6/1989
EP 1365037 11/2003
(Continued)

OTHER PUBLICATIONS

Bhadhon et al., "Effect of Galvanizing Heat Treatment on the Microstructure and Mechanical Properties of a 6Mn-1.5 Si Third Generation Advanced High Strength Steel" Galvatech 2015 Proceedings, AIST, pp. 936-943.
(Continued)

*Primary Examiner* — Jie Yang
(74) *Attorney, Agent, or Firm* — Alan G. Towner; Leech Tishman Fuscaldo & Lampl

(57) ABSTRACT

The present invention provides steel sheet products having controlled compositions that are subjected to two-step annealing processes to produce sheet products having desirable microstructures and favorable mechanical properties such as high strength and ultra-high formability. The steel sheet products may be cold rolled or hot rolled. Steels processed in accordance with the present invention exhibit favorable combined ultimate tensile strength and total elongation (UTS•TE) properties, and may fall into the category of Generation 3 advanced high strength steels, desirable in various industries including automobile manufacturers.

11 Claims, 16 Drawing Sheets

Related U.S. Application Data a continuation-in-part of application No. 16/459,757, filed on Jul. 2, 2019, which is a continuation of application No. 15/591,344, filed on May 10, 2017, now Pat. No. 10,385,419.

(60) Provisional application No. 62/396,602, filed on Sep. 19, 2016, provisional application No. 62/334,189, filed on May 10, 2016.

(51) Int. Cl.

| | | |
|---|---|---|
| *B32B 15/04* | (2006.01) | |
| *B32B 15/18* | (2006.01) | |
| *C21D 1/20* | (2006.01) | |
| *C21D 1/22* | (2006.01) | |
| *C21D 1/25* | (2006.01) | |
| *C21D 1/26* | (2006.01) | |
| *C21D 1/78* | (2006.01) | |
| *C21D 8/02* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/18* | (2006.01) | |
| *C22C 38/40* | (2006.01) | |
| *C22C 38/54* | (2006.01) | |
| *C23C 2/02* | (2006.01) | |
| *C23C 2/06* | (2006.01) | |
| *C23C 2/28* | (2006.01) | |
| *C23C 2/40* | (2006.01) | |
| *C23C 28/02* | (2006.01) | |
| *C25D 3/22* | (2006.01) | |
| *C25D 5/36* | (2006.01) | |

(52) U.S. Cl.
CPC .............. *C21D 1/20* (2013.01); *C21D 1/22* (2013.01); *C21D 1/25* (2013.01); *C21D 1/26* (2013.01); *C21D 1/78* (2013.01); *C21D 8/0247* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/40* (2013.01); *C22C 38/54* (2013.01); *C23C 2/0224* (2022.08); *C23C 2/06* (2013.01); *C23C 2/28* (2013.01); *C23C 2/40* (2013.01); *C23C 28/021* (2013.01); *C23C 28/025* (2013.01); *C25D 3/22* (2013.01); *C25D 5/36* (2013.01); *C21D 8/0236* (2013.01); *C21D 8/0278* (2013.01); *C21D 2211/001* (2013.01); *C21D 2211/005* (2013.01); *C21D 2211/008* (2013.01)

(58) Field of Classification Search
CPC ......... C21D 9/46; C22C 38/02; C23C 28/021; C23C 28/025; C23C 2/06; C25D 3/22; C25D 5/36; C25D 7/0614
USPC ........................................................ 148/518
See application file for complete search history.

(56) References Cited

U.S. PATENT DOCUMENTS

| | | |
|---|---|---|
| 4,561,911 A | 12/1985 | Tanikawa et al. |
| 5,143,558 A | 9/1992 | Smith |
| 5,284,680 A | 2/1994 | Bilimoria |
| 5,411,812 A | 5/1995 | Bilimoria |
| 5,618,355 A | 4/1997 | Koyama et al. |
| 5,798,007 A | 8/1998 | Boyer et al. |
| 6,423,426 B1 | 7/2002 | Kobayashi et al. |
| 6,464,808 B2 | 10/2002 | Pasquinet et al. |
| 6,547,898 B2 | 4/2003 | Mignard et al. |
| 6,558,815 B1 | 5/2003 | Suzuki et al. |
| 6,869,691 B2 | 3/2005 | Nagataki et al. |
| 6,911,268 B2 | 6/2005 | Takada et al. |
| 7,090,731 B2 | 8/2006 | Kashima et al. |
| 7,267,890 B2 | 9/2007 | Fujita et al. |
| 7,368,689 B2 | 5/2008 | Roehr et al. |
| 7,371,294 B2 | 5/2008 | Miura et al. |
| 7,384,489 B2 | 6/2008 | Raick et al. |
| 7,455,736 B2 | 11/2008 | Kashima et al. |
| 7,736,449 B2 | 6/2010 | Takada et al. |
| 7,824,509 B2 | 11/2010 | Fujita et al. |
| 7,879,160 B2 | 2/2011 | Sun |
| 7,919,194 B2 | 4/2011 | Kawamura et al. |
| 8,075,836 B2 | 12/2011 | Okada et al. |
| 8,137,487 B2 | 3/2012 | Nonaka et al. |
| 8,216,397 B2 | 7/2012 | Fujita et al. |
| 8,241,759 B2 | 8/2012 | Nakagaito et al. |
| 8,337,643 B2 | 12/2012 | Sun |
| 8,359,894 B2 | 1/2013 | Yoshii et al. |
| 8,425,225 B2 | 4/2013 | Pasquinet et al. |
| 8,430,975 B2 | 4/2013 | Nakagaito et al. |
| 8,480,819 B2 | 7/2013 | Futamura |
| 8,679,265 B2 | 3/2014 | Murakami et al. |
| 8,714,104 B2 | 5/2014 | Hoshino |
| 8,715,427 B2 | 5/2014 | Vandeputte et al. |
| 8,741,078 B2 | 6/2014 | Song et al. |
| 8,815,026 B2 | 8/2014 | Kaneko et al. |
| 8,834,651 B2 | 9/2014 | Matsumura et al. |
| 8,840,738 B2 | 9/2014 | Murakami et al. |
| 8,840,834 B2 | 9/2014 | Matsuda et al. |
| 8,844,462 B2 | 9/2014 | Onozawa et al. |
| 8,845,324 B2 | 9/2014 | Sedmak |
| 8,876,986 B2 | 11/2014 | Hata et al. |
| 8,876,987 B2 | 11/2014 | Matsuda et al. |
| 8,911,567 B2 | 12/2014 | Ogawa et al. |
| 8,918,199 B2 | 12/2014 | Claveroulas et al. |
| 8,932,729 B2 | 1/2015 | Kawata et al. |
| 8,951,366 B2 | 2/2015 | Sano et al. |
| 8,951,367 B2 | 2/2015 | Kawamura et al. |
| 8,986,468 B2 | 3/2015 | Miura et al. |
| 8,993,120 B2 | 3/2015 | Kawata et al. |
| 9,028,626 B2 | 5/2015 | Nakagaito et al. |
| 9,096,918 B2 | 8/2015 | Taniguchi et al. |
| 9,127,339 B2 | 9/2015 | Hoshino |
| 9,150,946 B2 | 10/2015 | Taniguchi et al. |
| 10,385,419 B2 | 8/2019 | Hoydick et al. |
| 10,626,485 B2 * | 4/2020 | Obata ................. C22C 38/00 |
| 11,268,162 B2 | 3/2022 | Hoydick et al. |
| 11,560,606 B2 | 1/2023 | Hoydick et al. |
| 2002/0017747 A1 | 2/2002 | Sugano et al. |
| 2003/0019550 A1 | 1/2003 | Hlady et al. |
| 2004/0166360 A1 | 8/2004 | Imai et al. |
| 2008/0023111 A1 | 1/2008 | Nakanishi et al. |
| 2008/0175743 A1 | 7/2008 | Futatsuka et al. |
| 2009/0123651 A1 | 5/2009 | Okada |
| 2009/0151820 A1 | 6/2009 | Haji et al. |
| 2009/0158975 A1 | 6/2009 | Cluzel et al. |
| 2009/0200174 A1 | 8/2009 | Ishizuka et al. |
| 2009/0315228 A1 | 12/2009 | Pasquinet et al. |
| 2010/0132848 A1 | 6/2010 | Ikeda et al. |
| 2011/0266725 A1 | 11/2011 | Mehrain et al. |
| 2012/0018060 A1 | 1/2012 | Fushiwaki et al. |
| 2012/0090737 A1 | 4/2012 | Fushiwaki et al. |
| 2013/0244056 A1 | 9/2013 | Kawamura et al. |
| 2013/0292010 A1 | 11/2013 | Kimura et al. |
| 2014/0083572 A1 | 3/2014 | Schwartz |

(56) References Cited

U.S. PATENT DOCUMENTS

| | | |
|---|---|---|
| 2014/0120371 A1 | 5/2014 | Mbacke et al. |
| 2014/0150930 A1 | 6/2014 | Lee et al. |
| 2014/0205855 A1 | 7/2014 | Kawata et al. |
| 2014/0209217 A1 | 7/2014 | Nakagaito et al. |
| 2014/0212684 A1 | 7/2014 | Kawata et al. |
| 2014/0212686 A1 | 7/2014 | Imai et al. |
| 2014/0227556 A1 | 8/2014 | Sato et al. |
| 2014/0230971 A1 | 8/2014 | Kawasaki et al. |
| 2014/0234655 A1 | 8/2014 | Takashima et al. |
| 2014/0234657 A1 | 8/2014 | Azuma et al. |
| 2014/0234660 A1 | 8/2014 | Kawata et al. |
| 2014/0255724 A1 | 9/2014 | Yamanaka et al. |
| 2014/0342183 A1 | 11/2014 | Wakabayashi et al. |
| 2015/0101712 A1 | 4/2015 | Futamura et al. |
| 2015/0111064 A1 | 4/2015 | Ikeda et al. |
| 2016/0177414 A1 | 6/2016 | Takashima et al. |
| 2016/0237520 A1 | 8/2016 | Tadao et al. |
| 2016/0304984 A1 | 10/2016 | Genaud |
| 2016/0355903 A1 | 12/2016 | Kwak et al. |
| 2016/0369369 A1 | 12/2016 | Takashima et al. |
| 2017/0218472 A1 | 8/2017 | Kawasaki et al. |
| 2017/0314091 A1* | 11/2017 | Kawasaki .............. C21D 6/002 |
| 2017/0327924 A1 | 11/2017 | Hoydick et al. |
| 2018/0057916 A1 | 3/2018 | Obata et al. |
| 2019/0062864 A1 | 2/2019 | Hoydick et al. |
| 2019/0390291 A1 | 12/2019 | Hoydick et al. |
| 2020/0332385 A1 | 10/2020 | Hoydick et al. |

FOREIGN PATENT DOCUMENTS

| | | |
|---|---|---|
| EP | 1865085 A1 | 12/2007 |
| EP | 2740812 A1 | 6/2014 |
| EP | 3009527 A1 | 4/2016 |
| EP | 3178949 | 6/2017 |
| EP | 3228722 A1 | 10/2017 |
| EP | 3263733 | 1/2018 |
| EP | 3508600 | 7/2019 |
| JP | S5891130 | 5/1983 |
| JP | 2002129241 | 5/2002 |
| JP | 2004218025 | 8/2004 |
| JP | 2006283130 | 10/2006 |
| JP | 4188581 | 11/2008 |
| JP | 2012153957 | 8/2012 |
| KR | 1020150075311 | 11/2015 |
| MX | 2017010539 A | 12/2017 |
| RU | 2235792 C2 | 9/2004 |
| RU | 2535890 | 12/2014 |
| RU | 2557862 C1 | 7/2015 |
| RU | 2583229 C1 | 5/2016 |
| RU | 2599654 C1 | 10/2016 |
| WO | 2014124749 | 8/2014 |
| WO | 2016132680 | 8/2016 |
| WO | 2016135794 | 9/2016 |
| WO | 2016194272 | 12/2016 |
| WO | 2015115059 A1 | 3/2017 |
| WO | 2016067625 A1 | 4/2017 |
| WO | 2019131189 | 7/2019 |

OTHER PUBLICATIONS

Ding et al., "Effect of intercritical temperature on quenching and partitioning steels originated from martensitic pre-microstructure" J. Mater. Res., vol. 29, No. 21, 2014, pp. 2525-2533.

Sugimoto et al., "Effects of Second Phase Morphology on Retained Austenite Morphology and Tensile Properties in a TRIP-aided Dual-phase Steel Sheet" ISIJ Int'l., vol. 33, 1993, No. 7, pp. 775-782.

ASTM E29-13, "Standard Practice for Using Significant Digits in Test Data to Determine Conformance with Specifications," ASTM International (five pages) (Dec. 2014) (Year 2014).

International Search Report and the Written Opinion of the International Searching Authority for International Application No. PCT/US2020/046847, 40 pages.

Hoydick et al., U.S. Appl. No. 16/119,742, filed Aug. 31, 2018, for "High Strength Annealed Steel Products".

Hoydick et al., U.S. Appl. No. 16/459,757, filed Jul. 2, 2019, for "Annealing Processes for Making High Strength Steel Products".

The International Search Report of the International Searching Authority for International Application No. PCT/US2017/031938, 5 pages.

Sugimoto et al., "Ductility and Formability of Newly Developed High Strength Low Alloy TRIP-aided Sheet Steels with Annealed Martensite Matrix", ISIJ International, vol. 42 (2002), No. 8, pp. 910-915.

* cited by examiner

HIGH STRENGTH ANNEALED STEEL PRODUCTS AND ANNEALING PROCESSES FOR MAKING THE SAME

CROSS-REFERENCE TO RELATED APPLICATIONS

This application is a continuation-in-part of U.S. patent application Ser. No. 15/591,344, filed May 10, 2017, now U.S. Pat. No. 10,385,419, which claims priority to U.S. Provisional Application No. 62/334,189 filed May 10, 2016, and U.S. Provisional Application No. 62/396,602 filed Sep. 19, 2016. This application is also a continuation-in-part of U.S. patent application Ser. No. 16/459,757, filed Jul. 2, 2019, which is a continuation of U.S. patent application Ser. No. 15/591,344. All of the foregoing applications are incorporated herein by reference.

FIELD OF THE INVENTION

The present invention relates to high strength steel products having favorable properties, and to annealing processes for making such products.

BACKGROUND INFORMATION

Over past several years, the worldwide steel industry has focused on development of a third generation of advanced high strength steel (AHSS) for the automotive market. These Generation 3 steels have a favorable balance of tensile strength and elongation, typically in a UTS•TE range of about 20,000 MPa % or greater. However, the steel industry has had a difficult time commercializing Generation 3 AHSS as the majority of approaches require high alloy content, e.g., typically greater than 4 weight percent manganese, which results in difficulties when manufacturing such steels with conventional steel production equipment. Additionally, currently available AHSS has been difficult to weld by techniques such as spot welding, have been difficult to coat with zinc-based galvanic coatings, and have been difficult to manufacture into the thin gauge sheet needed for wide scale application.

SUMMARY OF THE INVENTION

The present invention provides steel sheet products having controlled compositions that are subjected to two-step annealing processes to produce sheet products having desirable microstructures and favorable mechanical properties such as high strength and ultra-high formability. The steel sheet products may be cold rolled or hot rolled. Steels processed in accordance with the present invention exhibit favorable combined ultimate tensile strength and total elongation (UTS•TE) properties, e.g., of greater than 25,000 MPa-% when tested using standard subsize ASTM or full size JIS tensile testing procedures. In addition, steels produced in accordance with the present invention exhibit favorable combinations of TE and hole expansion, i.e., both global formability and local formability are good. Steels with these properties fall into the category of Generation 3 advanced high strength steels, and are highly desired by various industries including automobile manufacturers.

An aspect of the present invention is to provide a high strength rolled steel sheet product comprising from 0.12 to 0.5 weight percent C, from 1 to 3 weight percent Mn, and from 0.8 to 3 weight percent of a combination of Si and Al, wherein the steel sheet product has been subjected to a two-step annealing process, comprises ferrite and substantially equiaxed retained austenite grains having an average aspect ratio of less than 3:1, and has a combination of ultimate tensile strength and total elongation UTS•TE of greater than 25,000 MPa %.

Another aspect of the present invention is to provide a method of producing a high strength rolled steel sheet product comprising from 0.12 to 0.5 weight percent C, from 1 to 3 weight percent manganese, and from 0.8 to 3 weight percent of a combination of Si and Al. The method comprises subjecting the steel sheet product to a first step annealing process to achieve a predominantly martensitic microstructure, and subjecting the steel sheet product to a second step process comprising soaking the sheet product in an intercritical regime at a temperature of from 720 to 850° C., followed by holding the sheet product at a temperature of from 370 to 445° C.

These and other aspects of the present invention will be more apparent from the following description.

DETAILED DESCRIPTION

Figure 1:
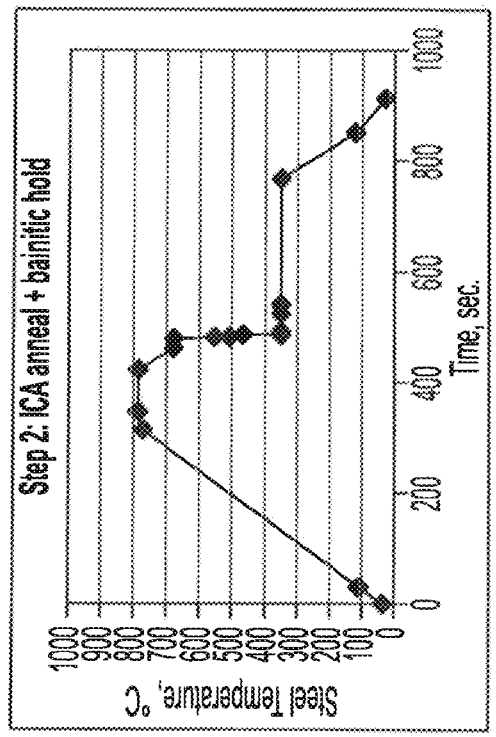
FIG. 1 includes plots of temperature versus time illustrating a two-step annealing process in accordance with an embodiment of the present invention.

The high strength steel sheet products of the present invention have controlled compositions that, in combination with controlled annealing processes, produce desirable microstructures and favorable mechanical properties including high strengths and ultra-high formabilities. In certain embodiments, the steel composition may include carbon, manganese and silicon, along with any other suitable alloying additions known to those skilled in the art. Examples of steel compositions including ranges of C, Mn, Si, Al, Ti, and Nb are listed in Table 1 below.

TABLE 1

Steel Compositions (wt. %)

| Example | C | Mn | Si | Al | Si + AL | Ti | Nb |
|---|---|---|---|---|---|---|---|
| A | 0.12-0.5 | 1-3 | 0-2 | 0-2 | 0.8-3 | 0-0.05 | 0-0.05 |
| B | 0.15-0.4 | 1.3-2.5 | 0.2-1.8 | 0-1.5 | 0.9-2.5 | 0-0.03 | 0-0.03 |
| C | 0.17-0.35 | 1.5-2.3 | 0.4-1.5 | 0-1 | 1-2 | 0-0.02 | 0-0.02 |

In addition to the amounts of C, Mn, Si, Al, Ti and Nb listed in Table 1, the steel compositions may include minor or impurity amounts of other elements, such as 0.015 max S, 0.03 max P, 0.2 max Cu, 0.02 max Ni, 0.2 max Cr, 0.2 max Mo, 0.1 max Sn, 0.015 max N, 0.1 max V, and 0.004 max B. As used herein the term "substantially free", when referring to the composition of the steel sheet product, means that a particular element or material is not purposefully added to the composition, and is only present as an impurity or in trace amounts.

In the steel sheet products of the present invention, C provides increased strength and promotes the formation of retained austenite. Mn provides hardening and acts as a solid solution strengthener. Si inhibits iron carbide precipitation during heat treatment, and increases austenite retention. Al inhibits iron carbide precipitation during heat treatment, and increases austenite retention. Ti and Nb may act as a strength-enhancing grain refiners.

In certain embodiments, Al may be present in an amount of at least 0.1 weight percent or at least 0.2 weight percent. For example, Al may be present in an amount of from 0.5 to 1.2 weight percent, or from 0.7 to 1.1 weight percent, in certain embodiments. Alternatively, the steel sheet product may be substantially free of Al.

Steel sheet products having compositions as described above are subjected to a two-stage annealing process, as more fully described below. The resultant sheet products have been found to possess favorable mechanical properties including desirable ultimate tensile strengths, high elongations, high lambda values, high bendability and high yield ratios (YS/UTS).

In certain embodiments, the ultimate tensile strength (UTS) of the steel sheet products range from 700 to 1,100 MPa or more. In certain embodiments, the steel sheet product has an ultimate tensile strength of greater than 700 MPa, for example, from 720 to 1,100 MPa, or from 750 to 1,050 MPa.

In certain embodiments, the steel sheet products have a total elongation (TE) typically greater than 22 percent, for example, greater than 27 percent, or greater than 33 percent. For example, the steel sheet product may have a total elongation of at least 20% or at least 25% or at least 27%, e.g., from 22 to 45%, or from 25 to 40%.

The steel sheet products may possess lambda ($\lambda$) values as measured by a standard hole expansion test typically greater than 20 percent, for example, greater than 25 percent, or greater than 30 percent, or greater than 35 percent. The whole expansion ratio or lambda may be greater than 20%, for example, from 22 to 80%, or from 25 to 60%.

In certain embodiments, increased values of both total elongation (TE) and hole expansion ($\lambda$) result in steel sheet products exhibiting good global formability and local formability.

Strength elongation balances (UTS•TE) of greater than 25,000 are observed for the present steel sheet products, making them fall into the category of Generation 3 steels highly desired by industries such as the auto industry. In certain embodiments UTS•TE values may be greater than 27,000, or greater than 30,000, or greater than 35,000.

In accordance with certain embodiments of the invention, the final microstructure of the steel sheet products may primarily comprise ferrite, e.g., at least 50% up to 80% or higher, with lesser amounts of retained austenite, e.g., from 5 to 25%, and minor amounts of fresh martensite, e.g., from 0 to 10% or 15%. The amounts of ferrite, austenite and martensite may be determined by standard EBSD techniques. Alternatively, retained austenite content may be determined by magnetic saturation methods. Unless otherwise specified herein, the volume percent of retained austenite is determined by the EBSD technique.

In certain embodiments, the retained austenite comprises from 1 to 25 volume percent, for example, from 5 to 20 volume percent. The amount of fresh martensite may comprise less than 15 volume percent, or less than 10 volume percent, or less than 5 volume percent. In certain embodiments, the steel sheet product is substantially free of fresh martensite. It has been found that when fresh martensite amounts are greater than 15%, hole expansion values decrease significantly, e.g., local formability is significantly decreased.

At least a portion of the ferrite may be formed during the heating section, as described below, by recrystallization and/or tempering of martensite, or during the cooling and holding section of the second annealing process by austenite decomposition. Some of the ferrite may be considered bainitic ferrite. The ferrite, austenite and martensite phases are fine grained, e.g., having average grain sizes of less than 10 microns, for example, less than 5 microns, or less than 3 microns. For example, ferrite grain size may range from less than 10 microns, for example, less than 8 microns, or less than 6 microns. Average austenite grain size may range from less than 2 microns, for example, less than 1 micron, or less than 0.5 micron. Martensite grain size, when present, may range from less than 10 microns, for example, less than 8 microns, or less than 6 microns.

The austenite grains may be substantially equiaxed, e.g., having average aspect ratios less than 3:1 or less than 2:1, for example, about 1:1. It has been found that amounts of retained austenite below about 5% results in significantly decreased total elongations (TE). It has further been found that amounts of retained austenite above 25% can only be obtained at very high carbon levels, which results in poor weldability.

Figure 2:
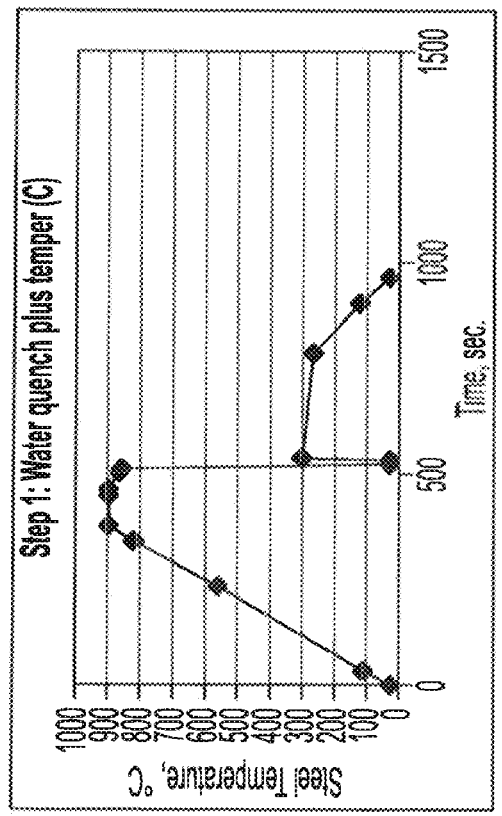
FIG. 2 includes plots of temperature versus time illustrating a two-step annealing process in accordance with another embodiment of the present invention.
Figure 2:
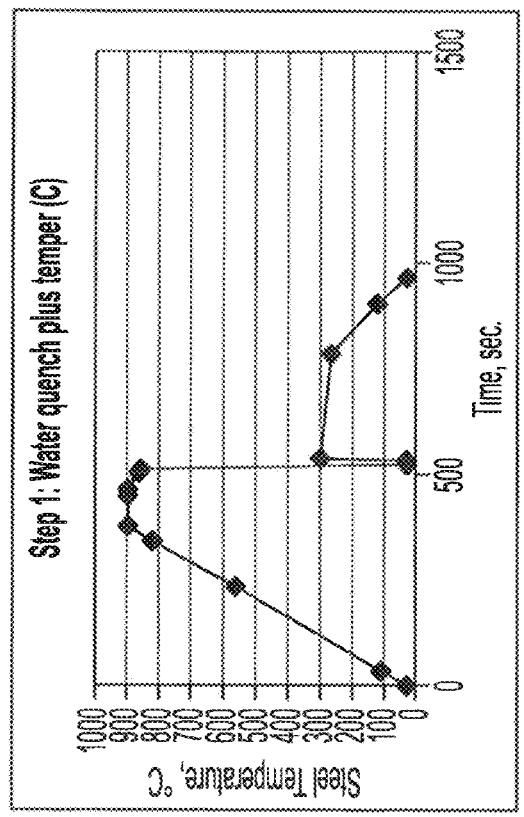
Figure 3:
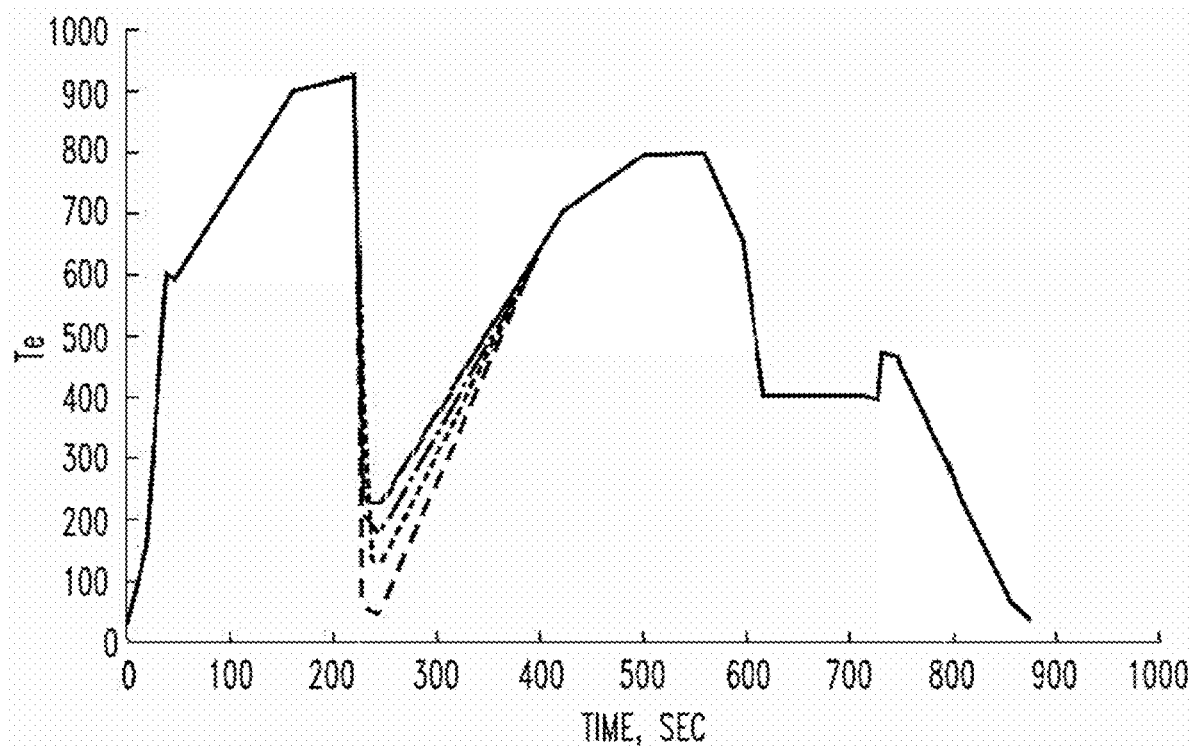
FIG. 3 is a plot of temperature versus time illustrating a two-step annealing process that combines the two-step thermal process with an optional zinc-based hot-dipped coating operation in a single production facility.

In certain embodiments of the invention, a two-step annealing process is used to produce advanced high strength steel products with favorable mechanical properties, such as those described above. Within each of the first and second annealing steps, multiple methodologies for undertaking the heat treatment may be used. Examples of two-step annealing processes are shown in FIGS. 1-3 and described below. FIG. 1 represents a continuous annealing line (CAL) followed by a continuous annealing line (CAL) production route. FIG. 2 represents a CAL plus continuous galvanizing line (CGL) production route. FIG. 3 represents a specially designed line allowing for both CAL+CAL or CAL+CGL steps to take place in a single facility. While a direct-fired furnace (DFF) followed by a radiant tube (RT) furnace embodiment is shown in FIG. 3, other embodiments such as all radiant tube, electric radiant heating, and the like may be used to achieve the desired thermal cycles.

Step 1

The goal of the first step of the annealing process is to achieve a martensitic microstructure in the cold rolled or hot rolled steel sheet product. In the first annealing stage of the first step, an annealing temperature above the $A_3$ temperature may typically be used, for example, an annealing temperature of at least 820° C. may be used. In certain embodiments, the first stage annealing temperature may typically range from 830 to 980° C., for example, from 830 to 940° C., or from 840 to 930° C., or from 860 to 925° C. In certain embodiments, the peak annealing temperature may be typically held for at least 20 seconds, for example, from 20 to 500 seconds, or from 30 to 200 seconds. Heating may be accomplished by conventional techniques such as a non-oxidizing or oxidizing direct-fired furnace (DFF), oxygen-enriched DFI, induction, gas radiant tube heating, electric radiant heating, and the like. Examples of heating systems that may be adapted for use in the processes of the present invention are disclosed in U.S. Pat. Nos. 5,798,007; 7,368,689; 8,425,225; and 8,845,324, U.S. Patent Application No. 2009/0158975, and Published PCT Application No. WO/2015083047, assigned to Fives Stein. Additional examples of heating systems that may be adapted for use in the processes of the present invention include U.S. Pat. No. 7,384,489 assigned to Dreyer International, and U.S. Pat. No. 9,096,918 assigned to Nippon Steel and Sumitomo Metal Corporation. Any other suitable known types of heating systems and processes may be adapted for use in Step 1 and Step 2.

In the first stage, after the peak annealing temperature is reached and held for the desired period of time, the cold rolled or hot rolled steel sheet is quenched to room temperature, or to a controlled temperature above room temperature, as more fully described below. The quench temperature may not necessarily be room temperature but should be below the martensite start temperature ($M_s$), and preferably below the martensite finish temperature ($M_F$), to form a microstructure of predominantly martensite. In certain embodiments, between the first step process and the second step process, the steel sheet product may be cooled to a temperature below 300° C., for example, below 200° C.

Quenching may be accomplished by conventional techniques such as water quenching, submerged knife/nozzle water quenching, gas cooling, rapid cooling using a combination of cold, warm or hot water and gas, water solution cooling, other liquid or gas fluid cooling, chilled roll quench, water mist spray, wet flash cooling, non-oxidizing wet flash cooling, and the like. A quench rate of from 30 to 2,000° C./sec may typically be used.

Various types of cooling and quenching systems and processes known to those skilled in the art may be adapted for use in the processes of the present invention. Suitable cooling/quenching systems and processes conventionally used on a commercial basis may include water quench, water mist cooling, dry flash and wet flash, oxidizing and non-oxidizing cooling, alkane fluid to gas phase change cooling, hot water quenching, including two-step water quenching, roll quenching, high percentage hydrogen or helium gas jet cooling, and the like. For example, dry flash and/or wet flash oxidizing and non-oxidizing cooling/quenching such as disclosed in published PCT Application No. WO2015/083047 to Fives Stein may be used. Other Fives Stein patent documents describing cooling/quenching systems and processes that may be adapted for use in the processes of the present invention include U.S. Pat. Nos. 6,464,808B2; 6,547,898B2; and 8,918,199B2, and U.S. Patent Application Publication Nos. US2009/0158975A1; US2009/0315228A1; and US2011/0266725A1. Other examples of cooling/quenching systems and processes that may be adapted for use in the processes of the present invention include those disclosed in U.S. Pat. Nos. 8,359,894B2; 8,844,462B2; and 7,384,489B2, and U.S. Patent Application Publication Nos. 2002/0017747A1 and 2014/0083572A1.

In certain embodiments, after the first-stage peak annealing temperature is reached and the steel is quenched to form martensite, the martensite can be optionally tempered to soften the steel somewhat to make further processing more feasible. Tempering takes place by raising the temperature of the steel in the range of room temperature to about 500° C. and holding for up to 600 seconds. If tempering is utilized, the tempering temperature may be held constant, or may be varied within this preferred range.

After tempering, the temperature is ramped down to room temperature. The rate of such ramp-down may typically range from 1 to 40° C./sec, for example, from 2 to 20° C./sec. In the case of a single pass facility furnace, as in FIG. 3, tempering may not be necessary.

Step 2

Figure 4:
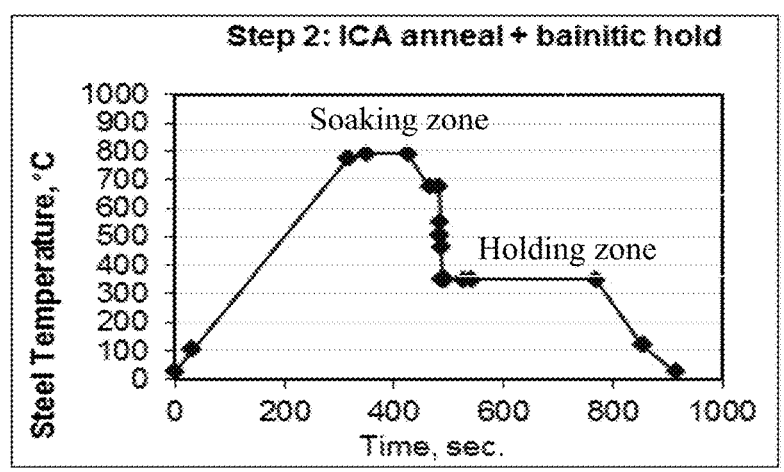
FIG. 4 is a plot of temperature versus time for a second step of an annealing process defining soaking and holding zones in the thermal cycle in accordance with an embodiment of the invention.

The second step of the annealing process may include a first stage that is conducted at relatively high annealing temperature, and a second stage that is conducted at relatively low temperature. These stages are defined as the "soaking" and "holding" zones of the second anneal, as described in FIG. 4. The temperatures are controlled in order to promote the formation of the desired microstructure in the final product.

In the first annealing stage of the second step, a soaking zone temperature between $A_1$ and $A_3$ may be used, for example, an annealing temperature of at least 720° C. may be used. In certain embodiments, the soaking zone temperature may typically range from 720 to 850° C., for example, from 760 to 825° C. In certain embodiments, the peak annealing temperature may be typically held for at least 15 seconds, for example, from 20 to 300 seconds, or from 30 to 150 seconds.

During the first stage of the second step, the soaking zone temperature may be achieved by heating the steel from a relatively low temperature below $M_s$, e.g., room temperature, at an average rate of from 0.5 to 50° C./sec, for example, from about 2 to 20° C./sec. In certain embodiments, the ramp-up may take from 25 to 800 seconds, for example, from 100 to 500 seconds. The first stage heating of the second step may be accomplished by any suitable heating system or process, such as using radiant heating, induction heating, direct fired furnace heating and the like.

After the soaking zone temperature is reached and held for the desired period of time, the steel may be cooled to a controlled temperature above room temperature to the holding zone. In certain embodiments, the steel sheet product is maintained at a temperature above 300° C. between the second step soaking process and the second step holding process. Cooling from the soaking to holding zone may be accomplished by conventional techniques such as water cooling, gas cooling and the like. An average cooling rate of from 5 to 400° C./sec may typically be used. Any suitable types of cooling and quenching systems may be adapted for use in cooling from the soaking temperature to the holding temperature, including those described above.

In accordance with embodiments of the invention, the holding zone step is carried out at a typical temperature of from 360 to 445° C., for example, from 370 to 440° C. The holding zone may be held for up to 800 seconds, for example, from 30 to 600 seconds.

The holding zone temperature may be held constant, or may be varied somewhat within the preferred temperature range. After holding, the steel may be reheated, such as by induction or other heating method, to enter a hot-dip coating pot at the proper temperature for good coating results, if the steel is to be hot-dip coated.

In certain embodiments, after the holding zone temperature has been maintained for a desired period of time, the temperature may be ramped down to room temperature. Such a ramp-down may typically take from 10 to 1,000 seconds, for example, from about 20 to 500 seconds. The rate of such ramp-down may typically range from 1 to 1,000° C./sec, for example, from 2 to 20° C./sec.

In accordance with certain embodiments, one or both of the first-step and second-step annealing processes may be performed on a continuous annealing line (CAL). After going through a CAL+CAL process, the steel may be electrogalvanized to produce a zinc based coated product.

In certain embodiments, the annealed steel sheet is hot-dip galvanized at the end of the holding zone. Galvanizing temperatures may typically range from 440 to 480° C., for example, from 450 to 470° C. In certain embodiments, the galvanizing step may be performed as part of the second-step annealing process on a continuous galvanizing line (CGL), e.g., as shown in FIG. 2. This CAL+CGL process can be used to produce both a zinc-based or zinc alloy-based hot-dip galvanized product or reheated after coating to produce an iron-zinc galvanneal type coated product. An optional nickel-based coating step can take place between the CAL and (CGL steps in the process to improve zinc coating properties. The use of a continuous galvanizing line in the second step increases the production efficiency of producing a coated GEN3 product versus using a CAL+CAL+EG route.

A galvanized product or zinc-based alloy hot-dip coated product can also be made on a specially designed CGL in which the two-step annealing can take place in a single line, as shown in FIG. 3. Galvannealing can also be an option in this case. Furthermore, a single production facility can also be specially designed and built to combine the two-step thermal process to produce uncoated Generation 3 steels as defined in the invention.

The following examples are intended to illustrate various aspects of the present invention, and are not intended to limit the scope of the invention.

Example 1

Figure 5:
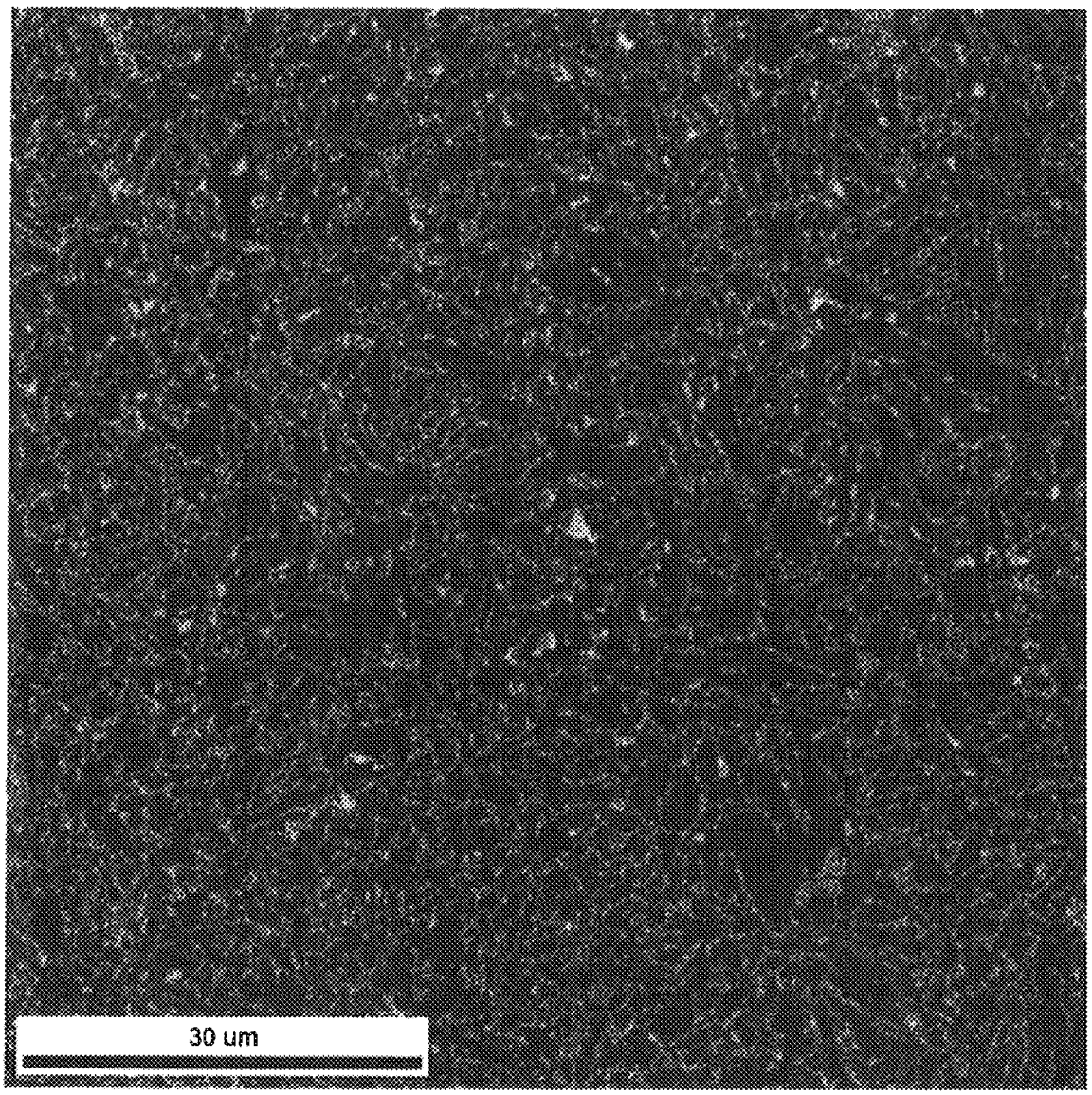
FIGS. 5 and 6 are electron backscatter diffraction (EBSD) photomicrographs illustrating the microstructure of a high strength steel sheet product in accordance with an embodiment of the invention.
Figure 6:
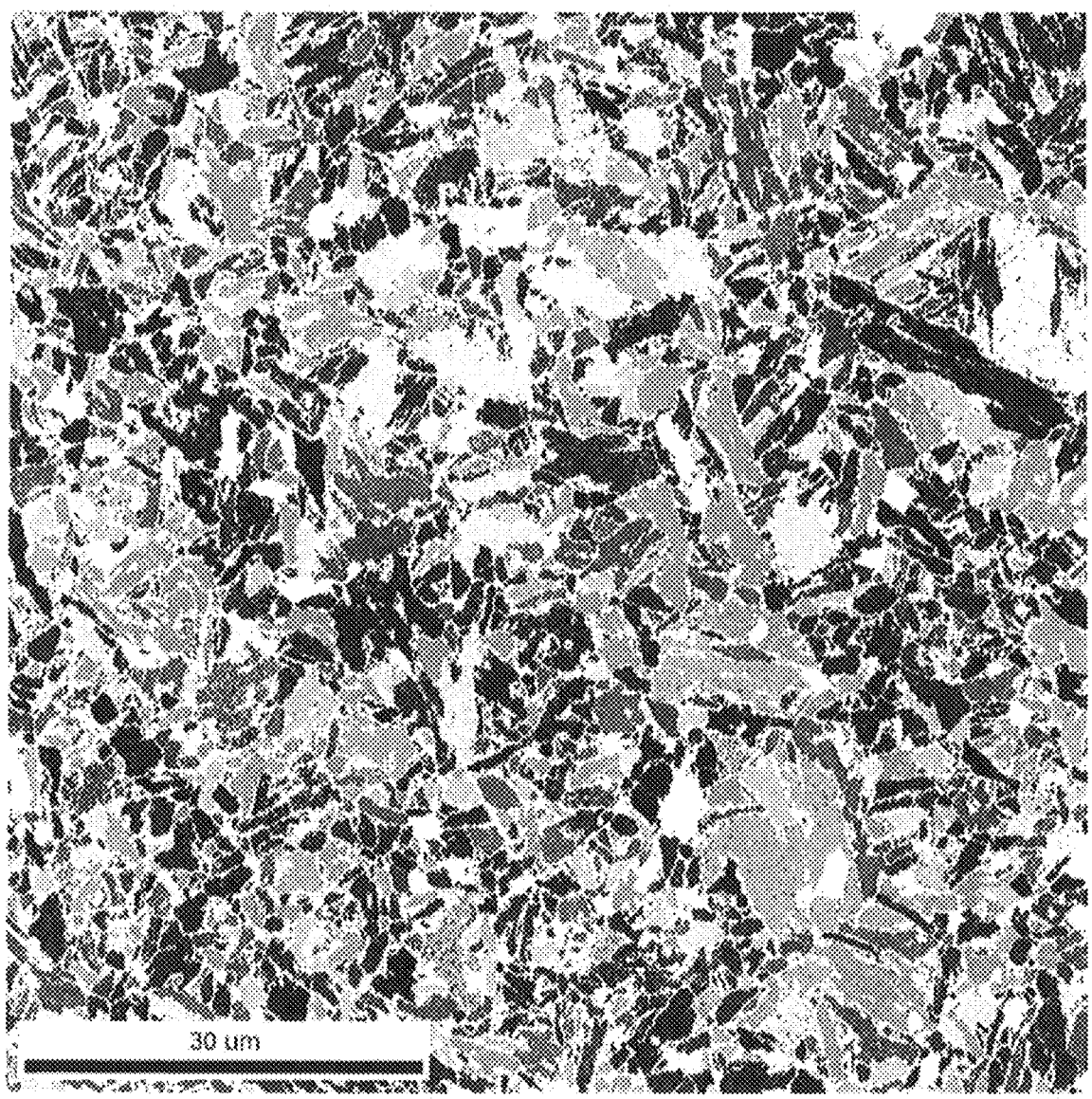

A cold rolled steel sheet having a composition as listed in Table 2, Sample No. 1, was subjected to a two-step annealing process as illustrated in FIG. 1. The microstructure of the resultant product is shown in FIGS. 5 and 6. EBSD techniques using commercial EDAX orientation imaging microscopy software show the dark ferrite grains and light austenite grains in FIG. 5.

Example 2

Figure 9:
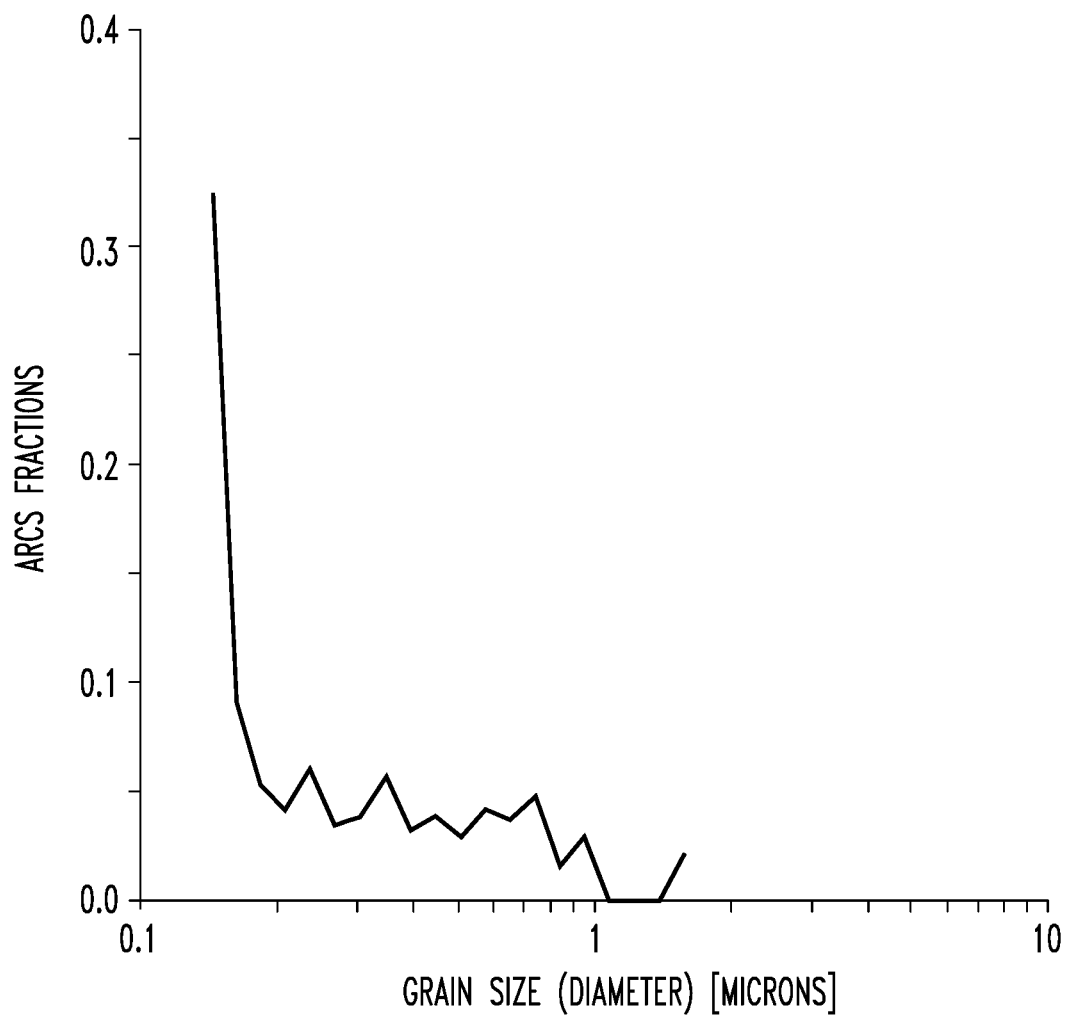
FIGS. 9 and 10 are graphs for a high strength steel sheet product showing austenite and ferrite grain size distributions in accordance with an embodiment of the invention.
Figure 10:
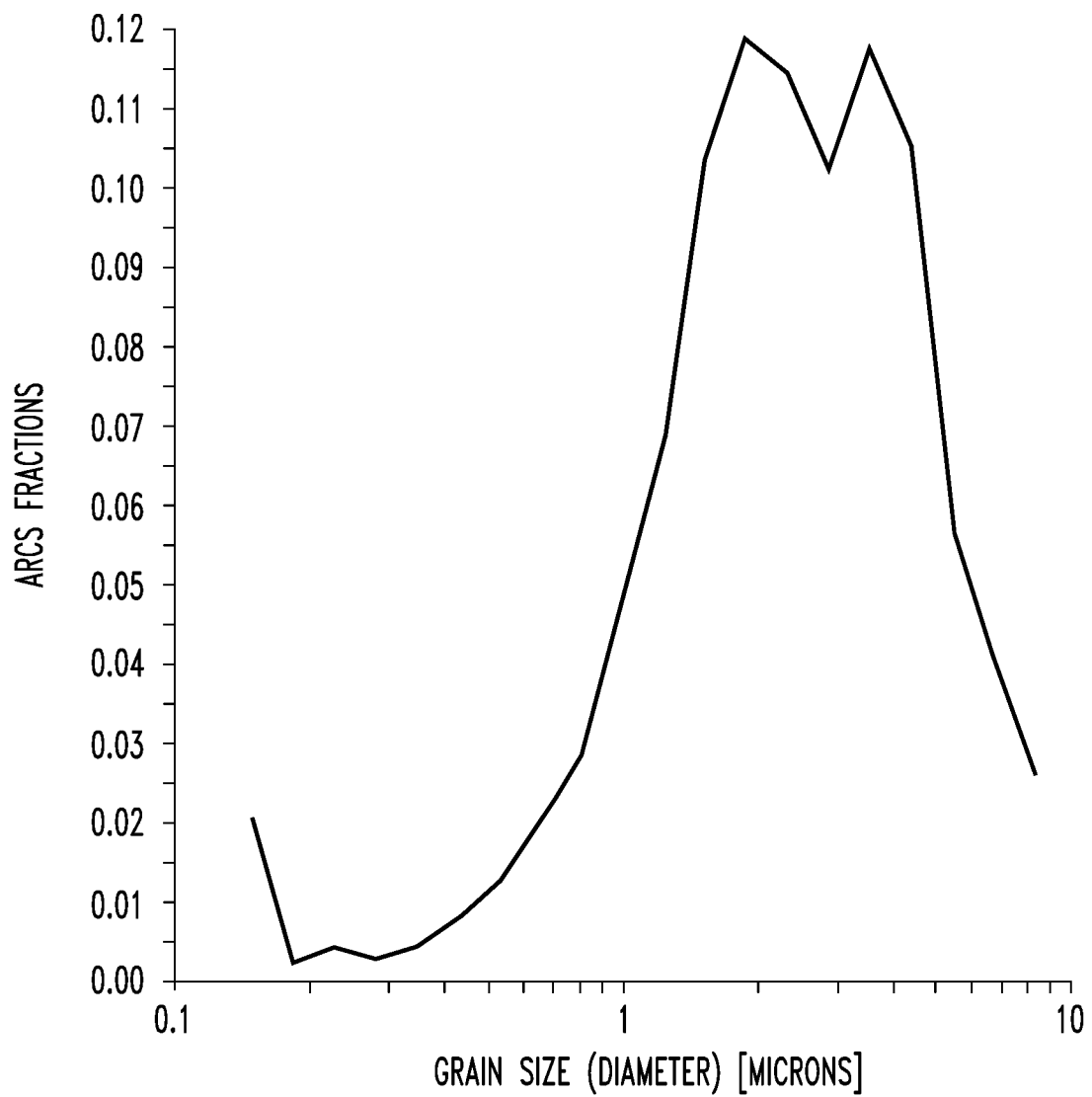
Figure 11:
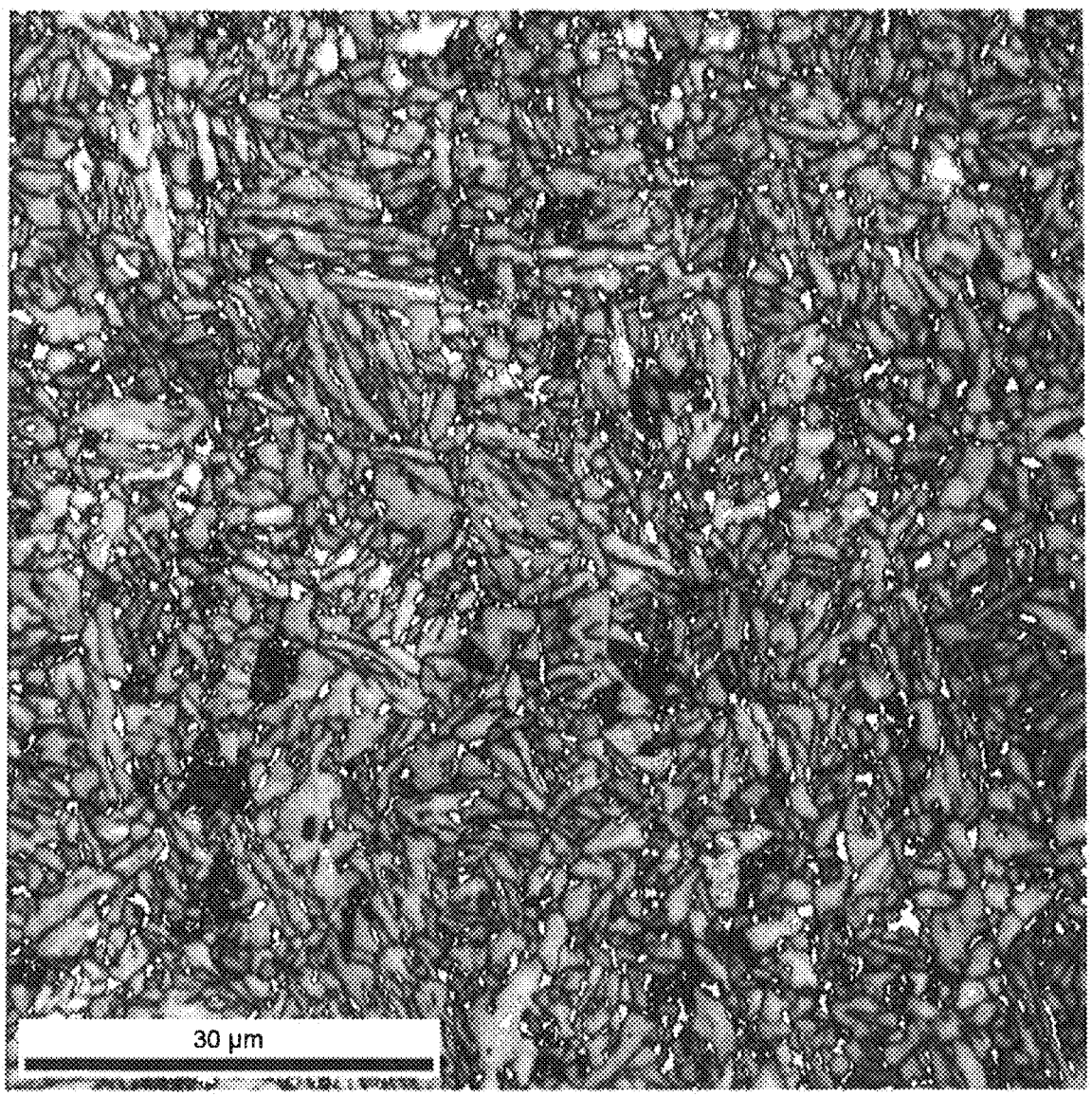
FIG. 11 is EBSD photomicrograph illustrating the microstructure of a high strength steel sheet product processed as shown in FIG. 1.

A cold rolled steel sheet having a composition as listed in Table 2, Sample No. 2, was subjected to a two-step annealing process as illustrated in FIG. 1. The microstructure of the resultant product is shown in FIG. 11. Mechanical properties of Sample No. 2 are listed in Table 2. Grain size distributions of austenite and ferrite are shown in FIGS. 9 and 10, respectively. The average austenite grain size is less than 1 micron and the average ferrite grain size is less than 10 microns.

The microstructure includes about 80 volume percent ferrite with an average grain size of about 5 microns, about 10 volume percent retained austenite having substantially equiaxed grains and an average grain size of about 0.5 micron, and about 10 volume percent fresh martensite with an average grain size of about 5 microns. Mechanical properties of Sample No. 1 are listed in Table 2 below.

Example 3

Figure 12:
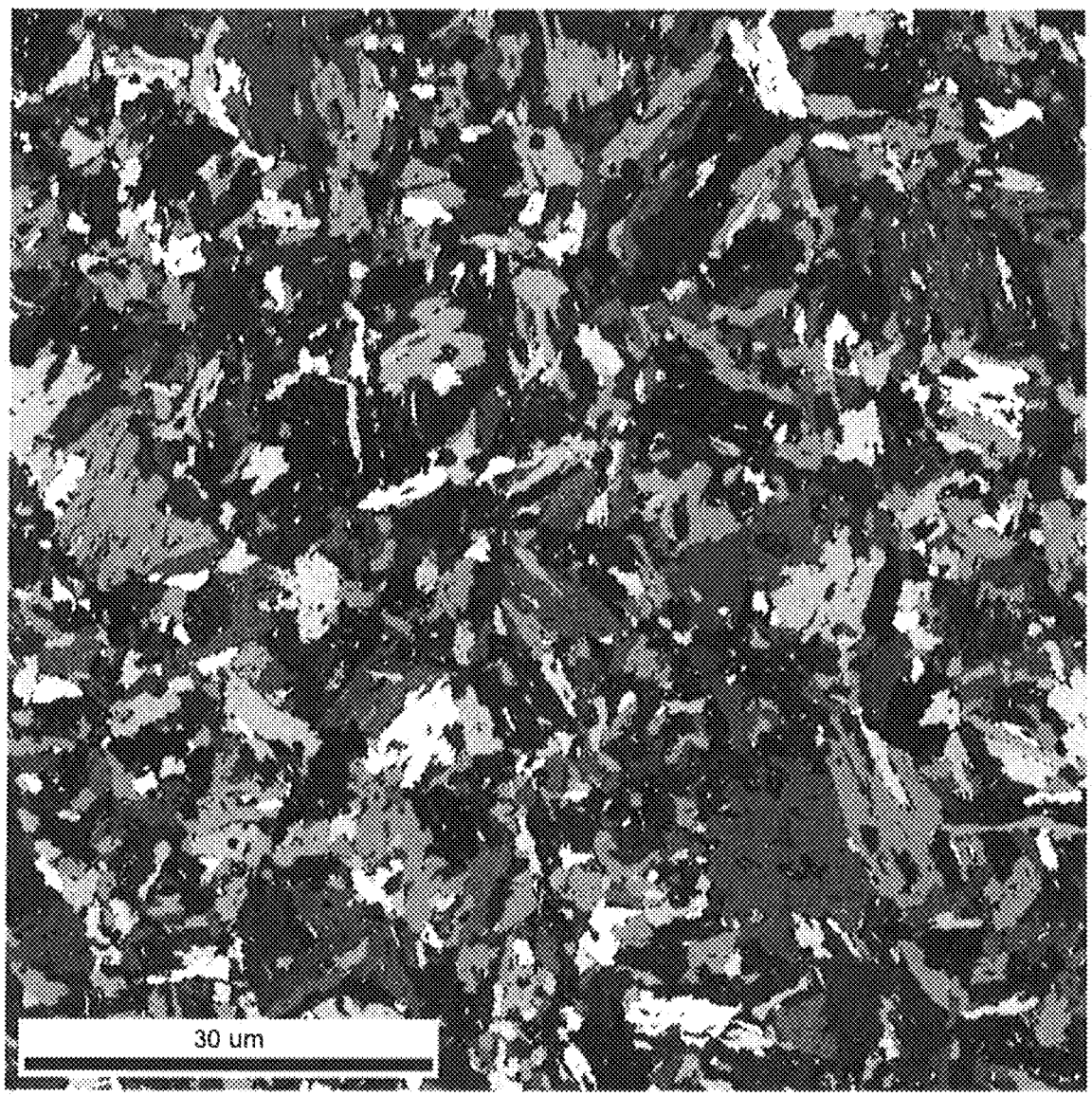
FIGS. 12 and 13 are EBSD photomicrographs showing steel sheet products processed as shown in FIG. 2.
Figure 13:
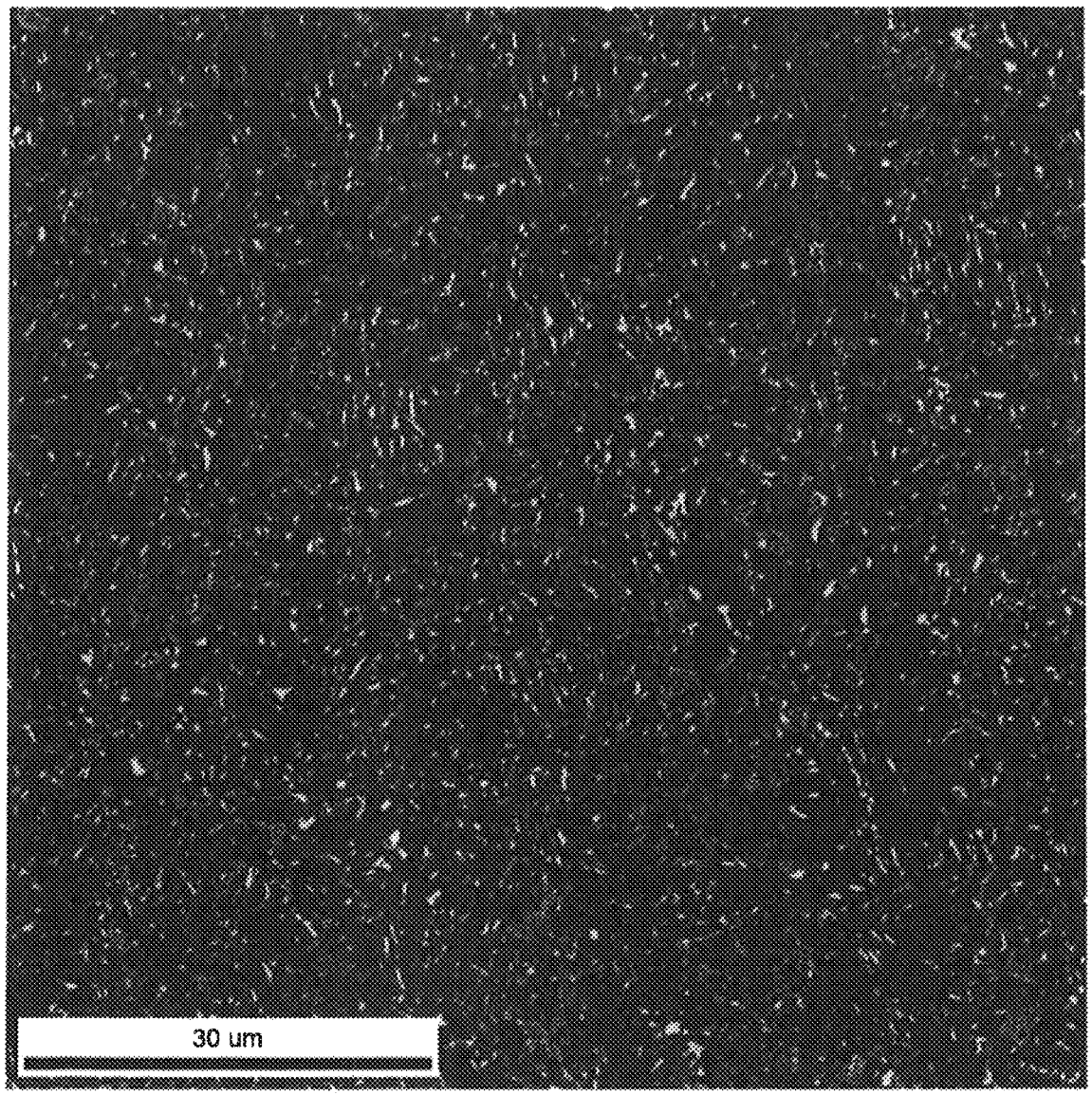

A cold rolled steel sheet having a composition as listed in Table 2, Sample No. 3, was subjected to a two-step annealing process as illustrated in FIG. 2. The microstructure of the resultant product is shown in FIGS. 12 and 13. In FIG. 13, austenite is light in color and ferrite is dark in color. Mechanical properties of Sample No. 3 are listed in Table 2.

Example 4

Figure 14:
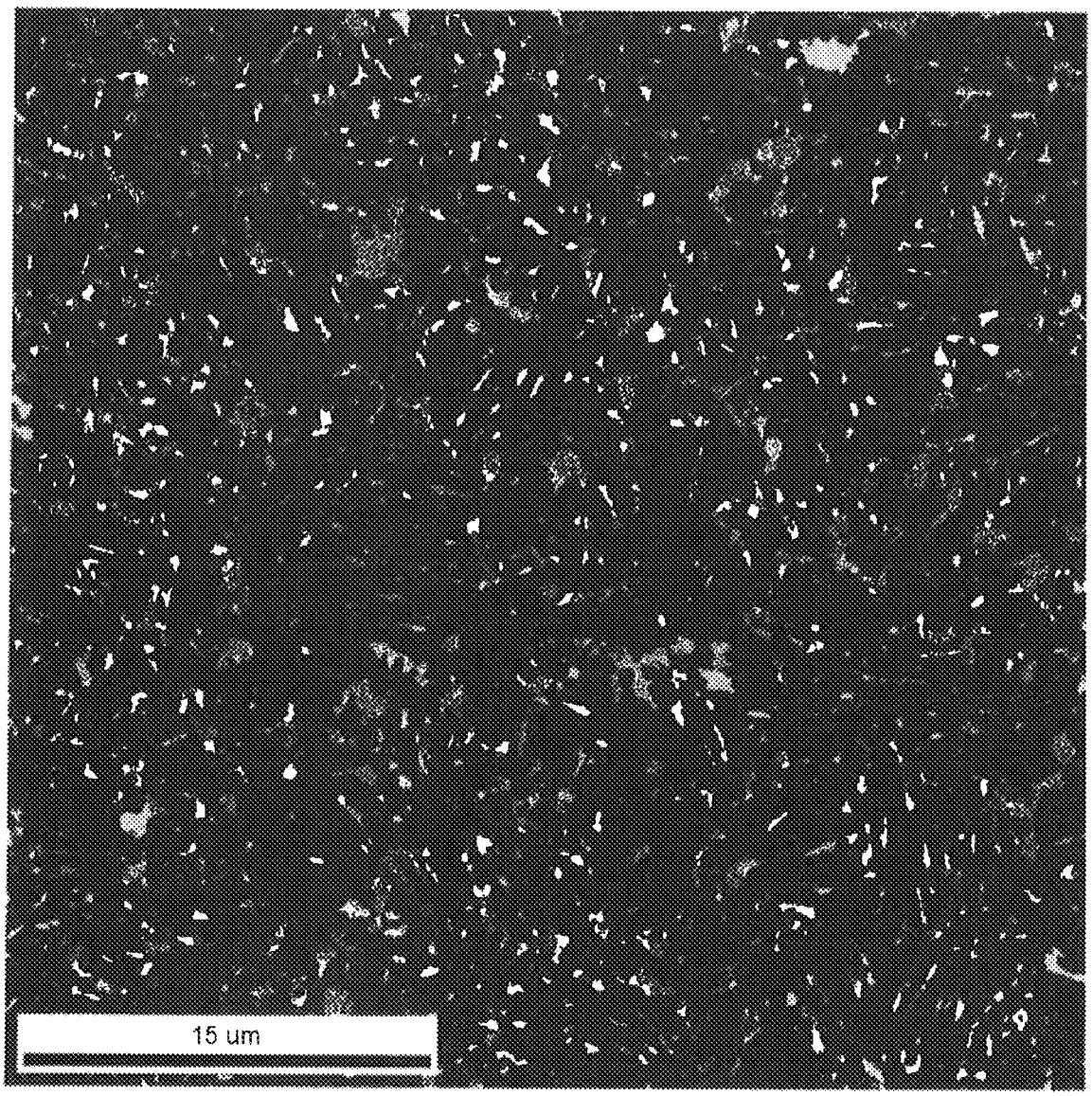
FIG. 14 is an EBSD photomicrograph of a steel sheet product processed as shown in FIG. 3.

A cold rolled steel sheet having a composition as listed in Table 2, Sample No. 4, was subjected to a two-step annealing process as illustrated in FIG. 3. The microstructure of the resultant product is shown in FIG. 14. In FIG. 14, austenite is light in color and ferrite is dark in color. Mechanical properties of Sample No. 4 are listed in Table 2.

Example 5

A cold rolled steel sheet having a composition as listed in Table 2, Sample No. 5, was subjected to a two-step annealing process as illustrated in FIG. 1. Mechanical properties of Sample No. 5 are listed in Table 2.

Example 6

Figure 7:
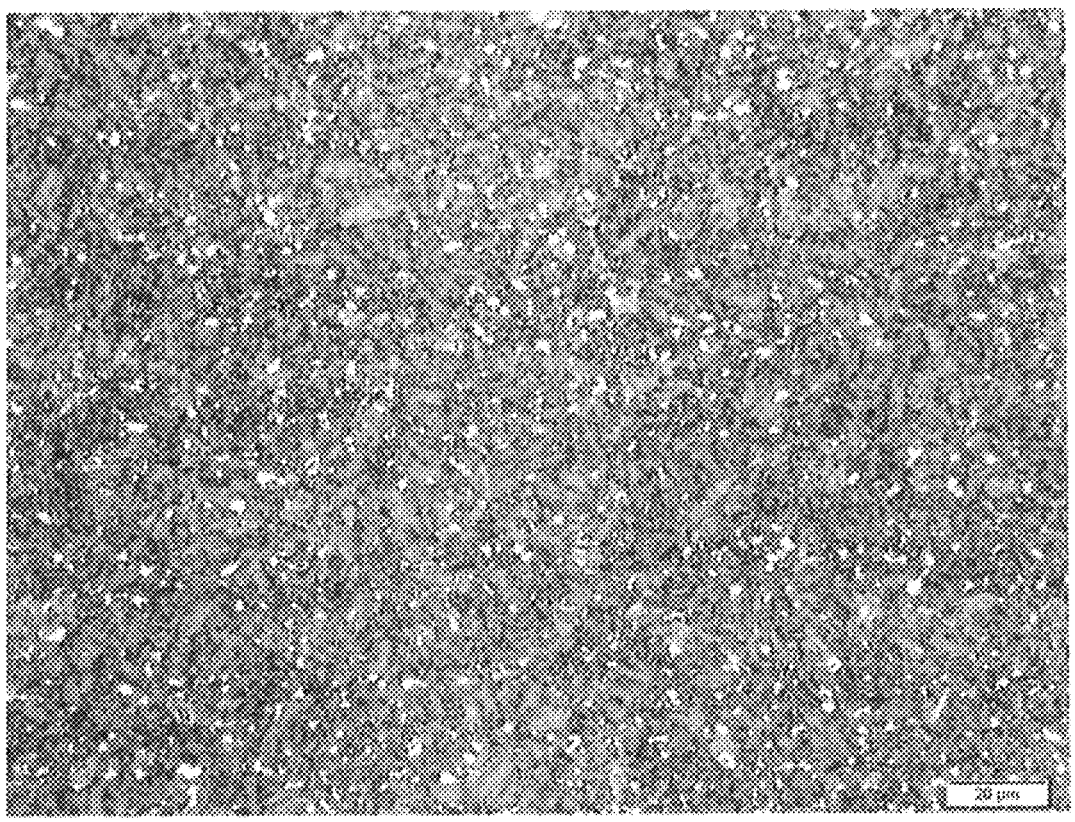
FIG. 7 is an optical photomicrograph of a steel sheet product subjected to the thermal process shown in FIG. 1, showing darker ferrite grains and lighter austenite grains.
Figure 8:
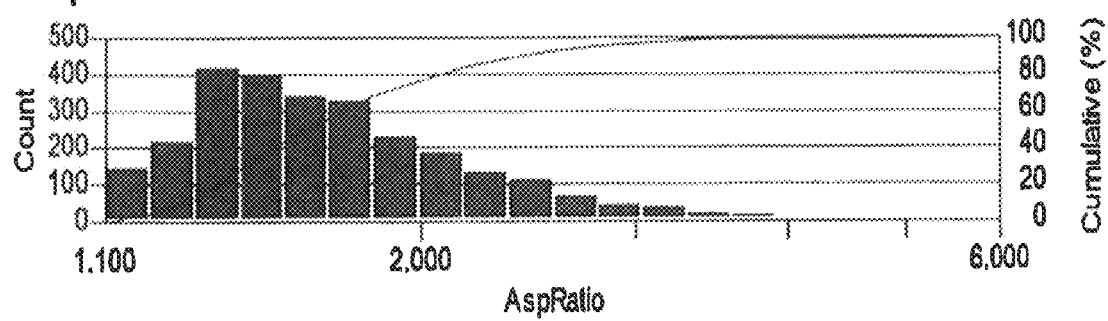
FIG. 8 is a bar graph illustrating aspect ratios of the austenite grains shown in FIG. 7.

A cold rolled steel sheet having a composition as listed in Table 2, Sample No. 6, was subjected to a two-step annealing process as illustrated in FIG. 1. Mechanical properties of Sample No. 6 are listed in Table 2. FIG. 7 is an optical image showing the microstructure of the steel shown in FIG. 2, Sample No. 6, which was subjected to the two-step annealing process shown in FIG. 1. In FIG. 7, the dark regions of the photomicrograph are ferrite grains, while the light regions are austenite grains. FIG. 8 is a graph illustrating the aspect ratios of the austenite grains shown in FIG. 7. The optical image of FIG. 7 was used to determine the aspect ratios of the austenite grains using image analysis with commercially available software. FIG. 7 shows that the average aspect ratio is less than 3:1 for the austenite grains.

Example 7

A cold rolled steel sheet having a composition as listed in Table 2, Sample No. 7, was subjected to a two-step annealing process as illustrated in FIG. 2. Mechanical properties of Sample No. 7 are listed in Table 2.

Example 8

A cold rolled steel sheet having a composition as listed in Table 2, Sample No. 8, was subjected to a two-step annealing process as illustrated in FIG. 3. Mechanical properties of Sample No. 8 are listed in Table 2.

The steels in Examples 1-8 exhibited UTS levels in the range of 700 to 1,100 MPa.

Comparative Examples 1-4

Cold rolled steel sheets having compositions as listed in Table 2, Sample Nos. C1-C4, were subjected to a two-step annealing process as illustrated in FIG. 1. Mechanical properties of Sample Nos. C1-C4 are listed in Table 2. The steels in Comparative Examples 1-4 exhibited UTS levels less than 700 MPa.

Comparative Examples 5-8

Cold rolled steel sheets having compositions as listed in Table 2, Sample Nos. C5-C8, were subjected to a two-step annealing process as illustrated in FIG. 1. Mechanical properties of Sample Nos. C5-C8 are listed in Table 2. The steels in Comparative Examples 5-8 exhibited UTS levels greater than 1,100 MPa.

Comparative Examples 9-11

Cold rolled steel sheets having compositions as listed in Table 2, Sample Nos. C9-C11, were subjected to a two-step annealing process similar to that illustrated in FIG. 1, except the soaking or holding temperature in the second anneal were outside the preferred ranges of the invention. Mechanical properties of Sample Nos. C9-C11 are listed in Table 2.

Comparative Example 12

A cold rolled sheet having a composition listed in Table 2, Sample No. C12, was subjected to a two-step annealing process similar to that illustrated in FIG. 2, except the holding zone temperature in the second anneal was outside the preferred range of the invention. Mechanical properties of Sample No. C12 are listed in Table 2.

TABLE 2

| Sample No. | Product Type | Process | C | Mn | Si | Other | YS (MPa) | UTS (MPa) | TE (%) | UTS · TE | Lambda |
|---|---|---|---|---|---|---|---|---|---|---|---|
| 1 | CR 780 GEN3 super elongation | CAL + CAL | 0.22 | 1.5 | 1.5 | | 657 | 831 | 39.2 | 32575 | 44 |
| 2 | CR 980 GEN3 | CAL + CAL | 0.185 | 2.2 | 1.4 | | 630 | 1030 | 25 | 25750 | 30 |
| 3 | Hot-dipped 980 GEN3 | CAL + CGL | 0.22 | 2.25 | 0.45 | 0.8 Al, 0.02 Ti, 0.02Nb | 576 | 988 | 30.2 | 29838 | 20 |
| 4 | Hot-dipped 980 GEN3 | Single process in newly designed CGL | 0.185 | 2.2 | 1.4 | | 580 | 998 | 29.1 | 29042 | |
| 5 | CR 980 GEN3 Super elongation | CAL + CAL | 0.35 | 1.5 | 1.5 | | 685 | 999 | 38.2 | 38161 | 25 |
| 6 | CR 780 GEN3 | CAL + CAL | 0.175 | 1.8 | 1.5 | | 630 | 840 | 33 | 27720 | 45 |
| 7 | Hot-dipped 780 GEN3 | CAL + CGL | 0.2 | 2.3 | 0.4 | 1.0 Al | 533 | 915 | 32.8 | 30012 | 30 |
| 8 | Hot-dipped 780 GEN3 | Single process in newly designed CGL | 0.2 | 2.3 | 0.4 | 1.0 Al | 589 | 865 | 34.4 | 29756 | |
| C1 | Alloy 1 | CAL + CAL | 0.105 | 1.55 | 1.2 | | 512 | 666 | 32.6 | 21712 | 67 |
| C2 | Alloy 2 | CAL + CAL | 0.14 | 1.5 | 1.3 | | 556 | 690 | 30.2 | 20838 | 59 |
| C3 | Alloy 3 | CAL + CAL | 0.17 | 1.1 | 1.1 | | 560 | 686 | 26.9 | 18453 | 53 |
| C4 | Alloy 4 | CAL + CAL | 0.13 | 0.9 | 0.9 | | 533 | 618 | 26.0 | 16068 | 81 |
| C5 | Alloy 1 | CAL + CAL | 0.21 | 2.15 | 1.5 | 0.003 B | 597 | 1125 | 17.2 | 19350 | 25 |
| C6 | Alloy 2 | CAL + CAL | 0.2 | 2.2 | 1.5 | 0.2 Mo | 585 | 1148 | 16.3 | 18712 | 13 |

TABLE 2-continued

| Sample No. | Product Type | Process | C | Mn | Si | Other | YS (MPa) | UTS (MPa) | TE (%) | UTS · TE | Lambda |
|---|---|---|---|---|---|---|---|---|---|---|---|
| C7 | Alloy 3 | CAL + CAL | 0.23 | 2.4 | 1.5 | 0.003 B | 683 | 1231 | 16.2 | 19942 | 6.7 |
| C8 | Alloy 4 | CAL + CAL | 0.19 | 2.64 | 2.0 | | 635 | 1359 | 14.8 | 20113 | 3.4 |
| C9 | Alloy 1 - High Soak (849 C.) | CAL + CAL | 0.18 | 2.2 | 1.34 | | 693 | 1058 | 18.2 | 19256 | 25 |
| C10 | Alloy 2 - Low Hold (350 C.) | CAL + CAL | 0.18 | 2.2 | 1.34 | | 602 | 1035 | 21.2 | 21942 | 30 |
| C11 | Alloy 3 - High Hold (450 C.) | CAL + CAL | 0.18 | 2.2 | 1.34 | | 477 | 1059 | 19.7 | 20862 | 19 |
| C12 | Alloy 4 - High Hold (471 C.) | CAL + CGL | 0.22 | 2.4 | 0.4 | 0.8 Al | 465 | 1012 | 23.0 | 23276 | 16.5 |

Figure 15:
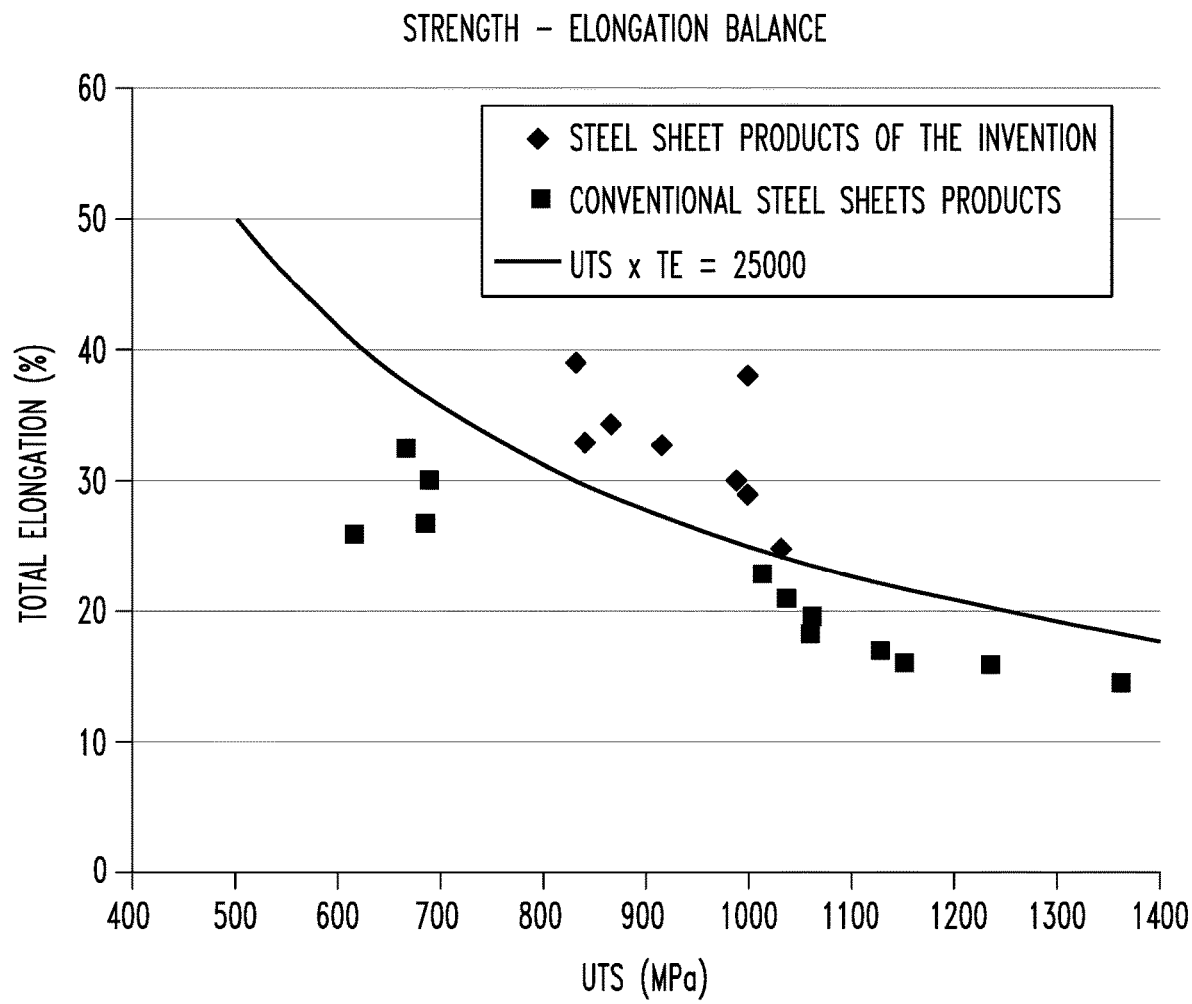
FIG. 15 is a graph of total elongation vs. ultimate tensile strength for high strength steel sheet products of the present invention in comparison with other steel sheet products processed outside the scope of the present invention.

FIG. 15 plots the total elongation (TE) and ultimate tensile strength (UTS) of Samples 1-8 of Examples 1-8, as well as Samples C1-C12 of Comparative Examples C1-C12. A line corresponding to UTS•TE of 25,000 is roughly drawn in FIG. 15. As can be seen, the high strength steel sheet samples produced in accordance with the present invention possess superior combinations of strength and elongation versus the comparative samples, i.e., high total elongation properties at high UTS levels are observed for the inventive examples. The Sample 1 through Sample 8 steels fall into the category of Generation 3 advanced high strength steels, which are highly desirable for automotive and other industries.

Example 9

Mill trials were conducted for samples labeled M1-M5 in Table 3 below using either the CAL+CAL or CAL+CGL process. For Samples M1, M2 and M5, the CAL+CAL processing times and temperatures shown in FIG. 1 were used. For Samples M3 and M4, the CAL+CGL processing times and temperatures shown in FIG. 2 were used.

TABLE 3

Mill Trial Results

| Mill Trial No. | Process | C | Mn | Si | Other | Coat | YS (MPa) | UTS (MPa) | TE (%) | UTS · TE | Lambda |
|---|---|---|---|---|---|---|---|---|---|---|---|
| M1 | CAL + CAL | 0.22 | 1.4 | 1.4 | | None | 627 | 810 | 38.6 | 31266 | 61 |
| M2 | CAL + CAL | 0.185 | 2.2 | 1.4 | | None | 624 | 1009 | 25 | 25255 | 38 |
| M3 | CAL + CGL | 0.23 | 2.4 | 0.4 | 0.8 Al, 0.02 Ti, 0.02Nb | HDGI | 567 | 989 | 26.4 | 26110 | 24 |
| M4 | CAL + CGL | 0.22 | 2.3 | 0.4 | 0.8 Al, 0.02 Ti, 0.02Nb | HDGI | 655 | 941 | 30.9 | 29077 | 33 |
| M5 | CAL + CAL | 0.19 | 2.25 | 1.5 | | None | 635 | 1048 | 25.3 | 26514 | 29 |

Figure 16:
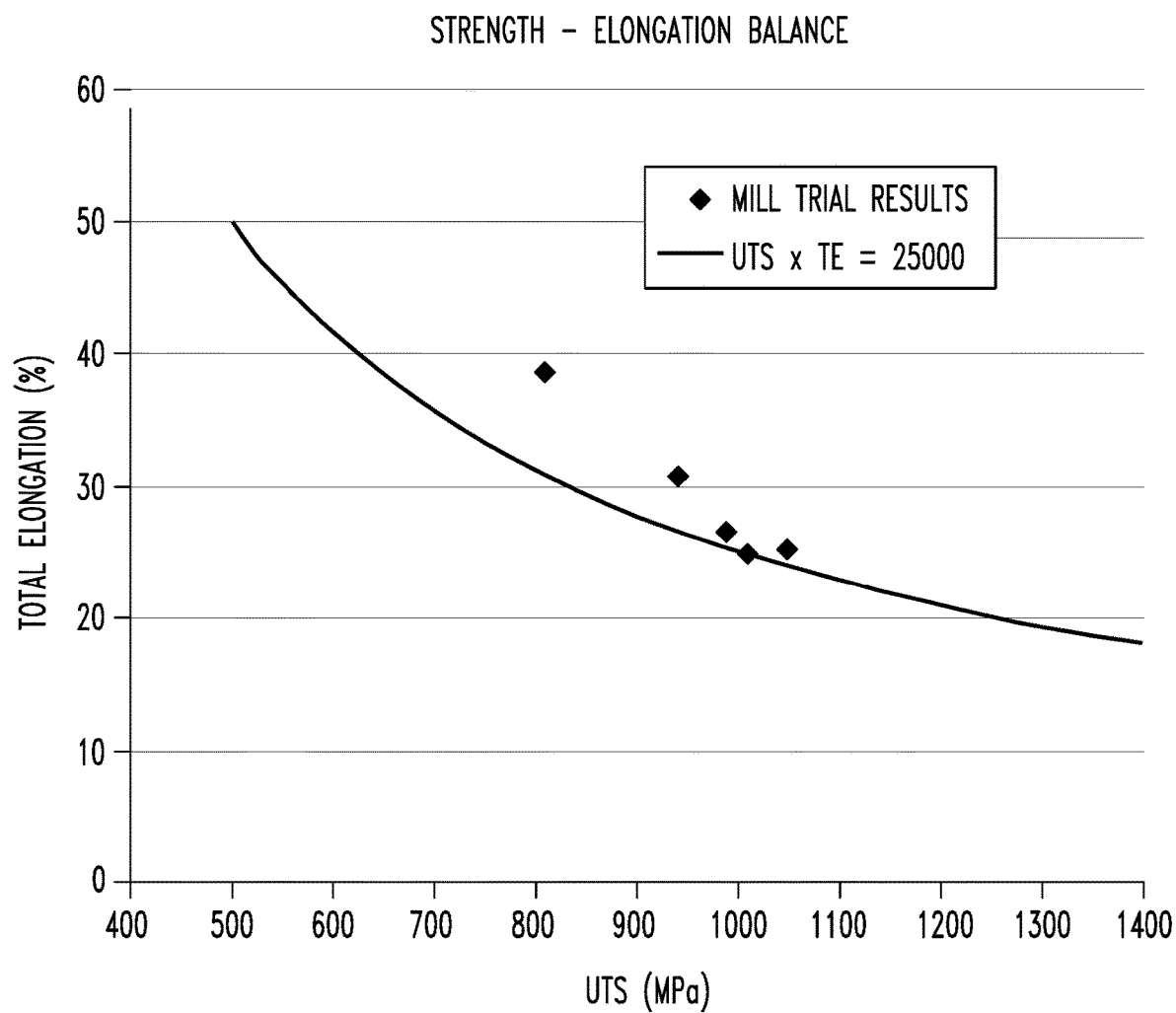
FIG. 16 is a graph of total elongation vs. ultimate tensile strength for high strength steel products produced in mill trials in accordance with embodiments of the present invention.

FIG. 16 shows the strength-elongation balance of the mill trial materials, all meeting a minimum UTS•TE of 25,000. The trial materials exhibited lambda values greater than 20%.

Example 10

Figure 17:
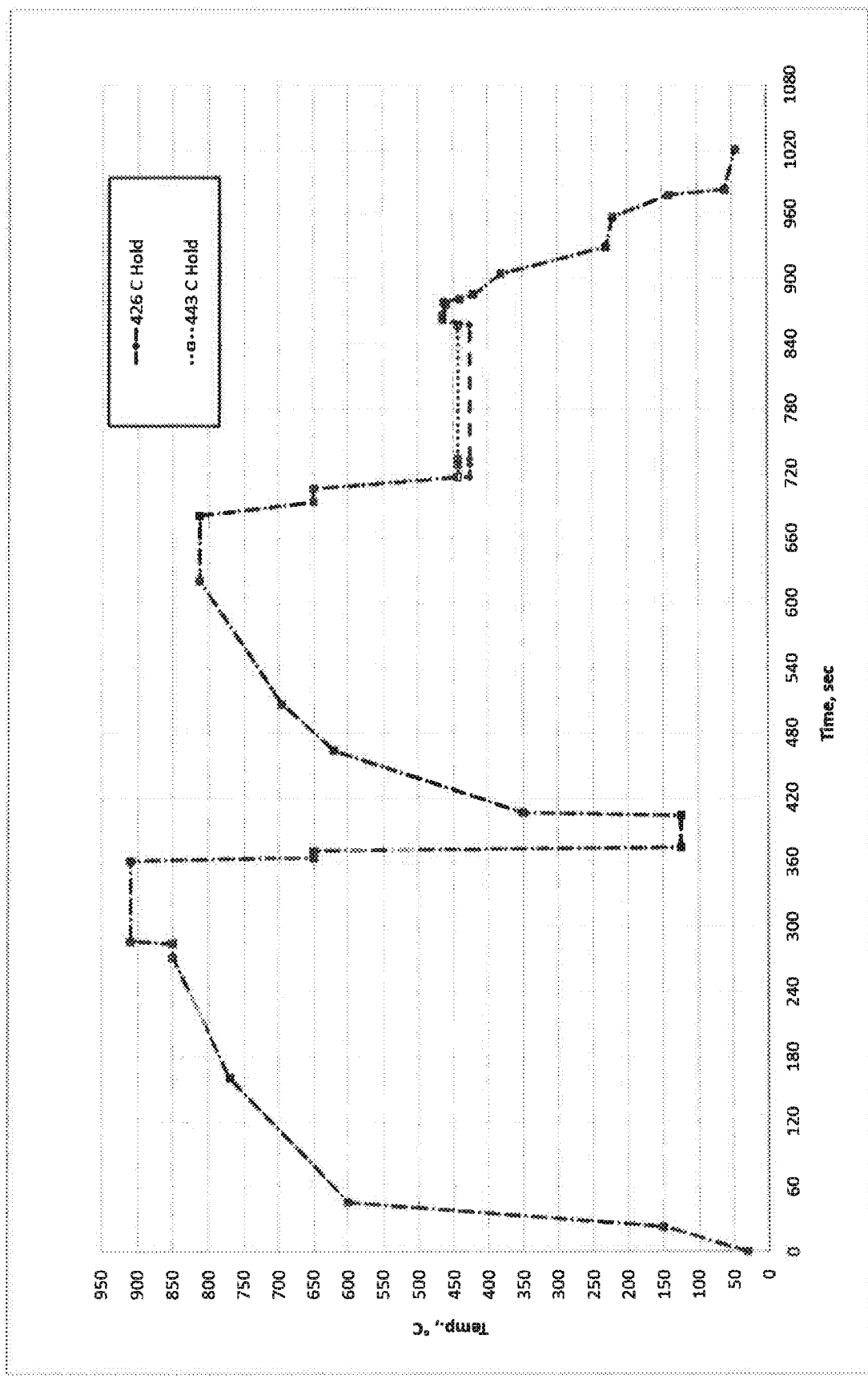
FIG. 17 is a plot of temperature versus time for cold rolled and hot rolled substrates processed with a thermal cycle in accordance with an embodiment of the invention.
Figure 18:
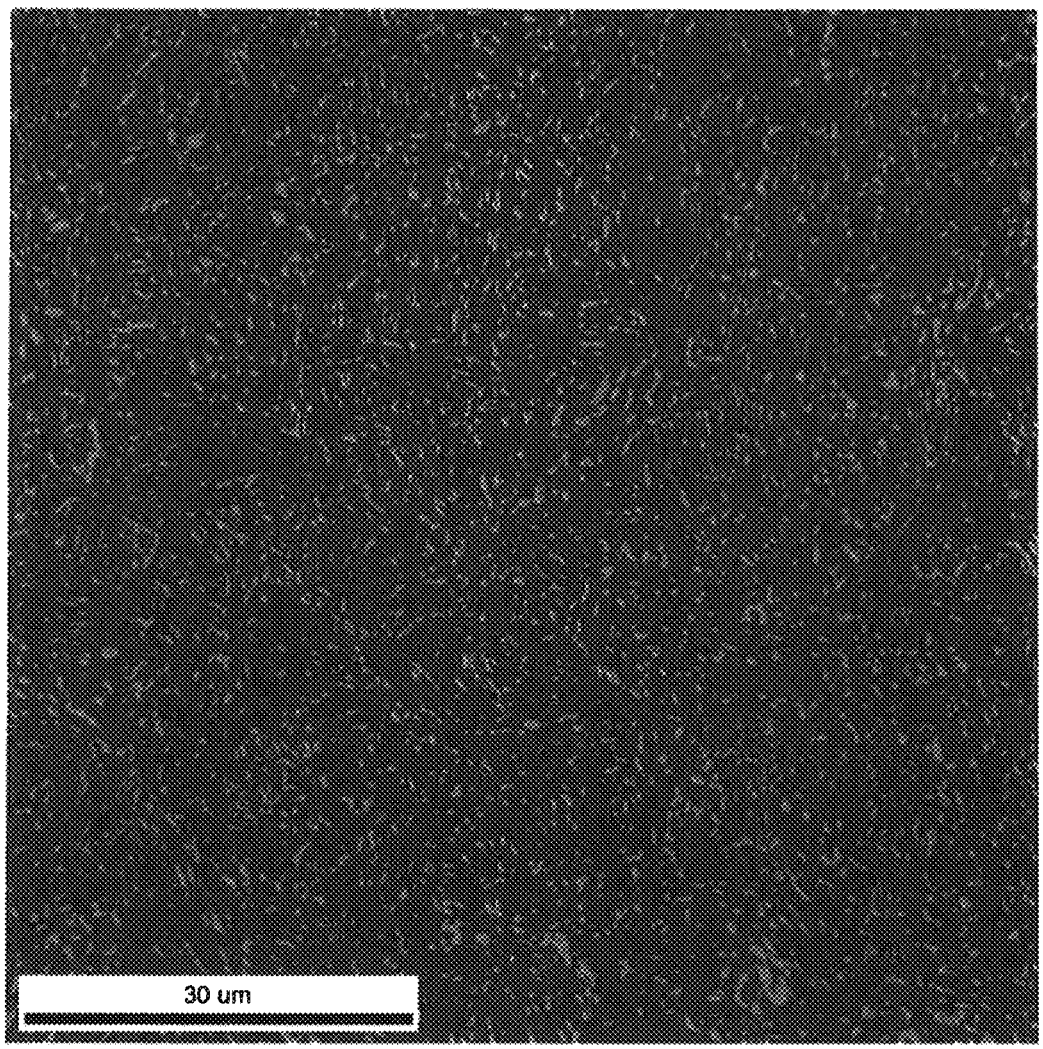
FIG. 18 is an EBSD photomicrograph of a cold rolled steel sheet substrate subjected to the thermal process shown in FIG. 17 showing darker ferrite grains and lighter retained austenite grains.
Figure 19:
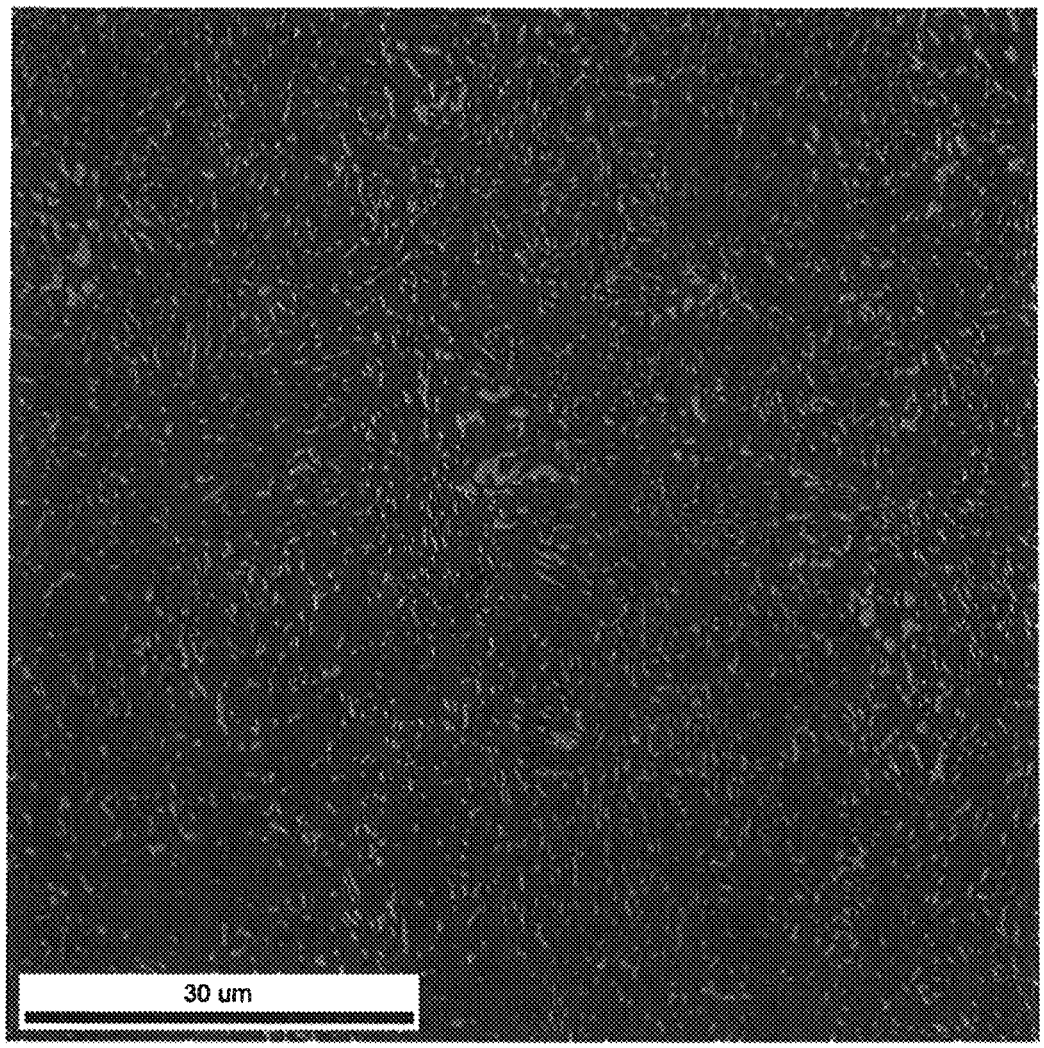
FIG. 19 is an EBSD photomicrograph of a hot rolled steel sheet substrate subjected to the thermal process shown in FIG. 17 showing darker ferrite grains and lighter retained austenite grains.

Cold rolled and hot rolled steel sheets having a composition of 0.23 weight percent C, 2.3 weight percent Mn, 0.6 weight percent Si and 0.8 weight percent Al corresponding to Sample Nos. 9A-12B in Table 4 were subjected to a two-stage annealing process as shown in FIG. 17. In Table 4, cold rolled samples are listed as "CR" substrate types, and hot rolled samples are listed as "HR" substrate types. Mechanical properties of Sample Nos. 9A-12B are listed in Table 4. The hot rolled substrate samples showed comparable exceptional YS, UTS, TE and hole expansion properties as the cold rolled samples, showing that a hot rolled substrate processed directly into the two stage annealing process can produce Generation 3 AHSS properties. Furthermore, as indicated in the EBSD phase maps shown in FIGS. 18 and 19 in which the retained austenite grains are lighter than the ferrite grains, similar austenite contents, distributions and morphologies are observed for the hot rolled material when compared to the cold rolled material. FIG. 18 shows the austenite content of cold rolled sample 11A and FIG. 19 shows the austenite content of hot rolled sample 12A. A fine, predominantly equiaxed distribution of austenite is observed in both microstructures.

TABLE 4

| Specimen ID | Substrate Type | Cycle Type | YS (MPa) | UTS (MPa) | TE (%) | UTS · TE | Hole Expansion Ratio (%) |
|---|---|---|---|---|---|---|---|
| 9A | CR | 427° C. | 706.32 | 973.2 | 31.39 | 30545.61 | 35 |
| 9B | | (800° F.) Hold - GI | 712.02 | 959.2 | 34.41 | 33006.07 | |
| 10A | HR | 427° C. | 696.37 | 963.8 | 30.26 | 29164.59 | 46 |
| 10B | | (800° F.) Hold - GI | 695.40 | 954.4 | 35.18 | 33575.79 | |
| 11A | CR | 443° C. | 618.23 | 1032.9 | — | | 31 |
| 11B | | (830° F.) Hold - GI | 614.00 | 1030.4 | 28.04 | 28892.42 | |
| 12A | HR | 443° C. | 650.39 | 1002.2 | 27.21 | 27269.86 | 35 |
| 12B | | (830° F.) Hold - GI | 622.82 | 1007.6 | 27.75 | 27960.90 | |

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A high strength rolled steel sheet product comprising from 0.12 to 0.5 weight percent C, from 1 to 3 weight percent Mn, from 0.8 to 3 weight percent of a combination of Si and Al, balance Fe wherein the steel sheet product has been subjected to a two-step annealing process, comprises ferrite, substantially equiaxed retained austenite grains having an average aspect ratio of less than 2.0:1, and less than 15 volume percent of fresh, untempered martensite, is substantially free of tempered martensite, and has a combination of ultimate tensile strength and total elongation UTS•TE of greater than 25,000 MPa % and a hole expansion ratio of at least 30 percent.

2. The high strength rolled steel sheet product of claim 1, wherein the Si comprises up to 2 weight percent, the Al comprises up to 2 weight percent, and the rolled steel sheet product further comprises up to 0.05 weight percent Ti, and up to 0.05 weight percent Nb.

3. The high strength rolled steel sheet product of claim 2, wherein the C comprises from 0.15 to 0.4 weight percent, the Mn comprises from 1.3 to 2.5 weight percent, the Si comprises from 0.2 to 1.8 weight percent, the Al comprises up to 1.5 weight percent, the Ti comprises up to 0.03 weight percent, and the Nb comprises up to 0.03 weight percent.

4. The high strength rolled steel sheet product of claim 1, wherein the ferrite comprises at least 50 volume percent, and the retained austenite comprises from 5 to 25 volume percent.

5. The high strength rolled steel sheet product of claim 1, wherein the retained austenite has an average grain size of less than 10 microns.

6. The high strength rolled steel sheet product of claim 1, wherein the retained austenite has an average grain size of less than 1 micron.

7. The high strength rolled steel sheet product of claim 1, wherein the rolled steel sheet product has an ultimate tensile strength of from 720 to 1,100 MPa and has a total elongation of at least 20 percent.

8. The high strength rolled steel sheet product of claim 1, wherein the UTS TE is at least 27,000 MPa %.

9. The high strength rolled steel sheet product of claim 1, further comprising a zinc-based coating on the rolled steel sheet product.

10. The high strength rolled steel sheet product of claim 1, wherein the rolled steel sheet product is hot rolled.

11. The high strength rolled steel sheet product of claim 1, wherein the retained austenite has an average grain size of less than 0.5 micron.

\* \* \* \* \*